US009485718B2

(12) United States Patent
Vuchula et al.

(10) Patent No.: US 9,485,718 B2
(45) Date of Patent: Nov. 1, 2016

(54) OUT-OF-SERVICE RECOVERY FOR A MULTI-SIM WIRELESS DEVICE

(71) Applicant: QUALCOMM Incorporated, San Diego, CA (US)

(72) Inventors: Karthik Nagpal Bengoti Vuchula, Hyderabad (IN); Shivank Nayak, San Diego, CA (US); Rajesh Madhukar Patil, Hyderabad (IN); Jiming Guo, Beijing (CN); Venugopal Krishna Srinivasa Srungaram, Hyderabad (IN); Chih-Ping Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/332,450

(22) Filed: Jul. 16, 2014

(65) Prior Publication Data
US 2015/0079985 A1 Mar. 19, 2015

(30) Foreign Application Priority Data

Sep. 13, 2013 (CN) .......................... 2013 1 0419100
Sep. 13, 2013 (IN) ............................ 4126/CHE/2013

(51) Int. Cl.
*H04M 1/00* (2006.01)
*H04W 48/16* (2009.01)
(Continued)

(52) U.S. Cl.
CPC ............. *H04W 48/16* (2013.01); *H04W 88/06* (2013.01); *H04W 48/18* (2013.01); *H04W 52/00* (2013.01)

(58) Field of Classification Search
CPC ............... H04W 48/16; H04W 48/18; H04W 52/0229; H04W 52/287; H04W 52/58; H04W 52/02; H04W 52/04; H04W 52/0241; H04W 88/06; H04W 36/14; H04W 76/02; H04W 36/0011

USPC ............ 455/426.1, 432.1, 432.3, 434, 435.2, 455/435.3, 552.1, 557, 558, 522, 574
See application file for complete search history.

(56) References Cited

U.S. PATENT DOCUMENTS 6,799,030 B2   9/2004  Barber et al.
7,313,419 B2  12/2007  Islam et al.
(Continued)

FOREIGN PATENT DOCUMENTS

EP   1863313 A1  12/2007
EP   2490468 A2   8/2012

OTHER PUBLICATIONS

International Search Report and Written Opinion—PCT/US2014/047077—ISA/EPO—Oct. 27, 2014.

*Primary Examiner* — Jean Gelin
(74) *Attorney, Agent, or Firm* — The Marbury Law Group, PLLC

(57) ABSTRACT

Various embodiments enable recovering from an out-of-service state in a wireless device. A processor may perform scans of a first acquisition database to acquire a first renewed service connection for a first subscriber identification module (SIM). The scans include first and second searches for first and second channels identified in first and second technology lists, respectively, from the first acquisition database, respectively, until either a renewed service connection is acquired or each of the first and second technology lists are exhausted. The first and second technology lists identify channels from first and second radio access technologies. A currently used channel of a second SIM acquired service is first on the first technology list. The processor may perform a full frequency scan to acquire a first renewed service connection for the first SIM in response to determining that each of the first and second technology lists were exhausted.

30 Claims, 11 Drawing Sheets

(51) Int. Cl.
*H04W 88/06* (2009.01)
*H04W 48/18* (2009.01)
*H04W 52/00* (2009.01)

(56) References Cited

U.S. PATENT DOCUMENTS

| | | |
|---|---|---|
| 8,351,892 B2 | 1/2013 | Deng |
| 8,369,255 B2 | 2/2013 | Umatt et al. |
| 8,527,014 B2 | 9/2013 | Amerga et al. |
| 2009/0088154 A1 | 4/2009 | Umatt et al. |
| 2010/0136914 A1* | 6/2010 | Keshav ............... H04W 48/16 455/62 |
| 2011/0263290 A1* | 10/2011 | Nam ............... H04W 52/0225 455/552.1 |
| 2014/0274051 A1* | 9/2014 | Hsu ............... H04W 36/20 455/436 |
| 2015/0146685 A1* | 5/2015 | Han ............... H04W 36/30 370/331 |

* cited by examiner

OUT-OF-SERVICE RECOVERY FOR A MULTI-SIM WIRELESS DEVICE

RELATED APPLICATIONS

This application claims the benefit of priority to Indian Patent Application No. 4126/CHE/2013 entitled "Out-Of-Service Recovery Using an Acquisition Database in a Wireless device" filed Sep. 13, 2013; and Chinese Patent Application No. 201310419100.3 entitled "Out-Of-Service Recovery for a Multi-SIM Wireless device" filed Sep. 13, 2013, the entire contents of which are hereby incorporated by reference for all purposes.

BACKGROUND

Conserving power in a wireless device is a paramount concern, as the wireless device is typically powered by limited battery resources. To conserve power, the wireless device may periodically operate in a low-power mode, often referred to as "standby" mode. When operating in standby mode, the wireless communication device reduces power consumption by disconnecting power to selected internal components. Additionally, slotted paging techniques have been developed, in which paging signals are sent from a base station to wireless devices within assigned paging slots, separated by predetermined intervals of time. Slotted paging allows a wireless device to remain in a low power standby mode during the period between consecutive paging slots in order to conserve battery power without missing paging signals.

When a wireless device operates out-of-service, the wireless communication device is unable to receive any service signals from base stations. An out-of-service condition may occur upon initial power-up or upon a loss of service during normal operation. In either case, the wireless device is unable to operate in standby mode as the wireless device does not know when or in which frequency band to look for paging signals. Instead, conventional wireless device continues to periodically search for a service signal in both frequency and code space. However, such searching consumes a significant amount of power and quickly drains battery resources in the wireless device. Additionally, in a wireless device the time spent trying to reacquire service may be multiplied in some devices since recovery may be attempted individually for each subscriber identification module (SIM) within the device.

SUMMARY

Various embodiments include a method of recovering from an out-of-service state in a wireless device in a manner that may improve reacquisition performance in certain circumstances while conserving battery power. In some embodiments, a first technology scan may be performed to acquire a first renewed service connection for a first SIM within the wireless device. The first technology scan may include first searches for first channels identified in a first technology list until either a first renewed service connection for the first SIM is acquired or the first technology list is exhausted. The first technology list may identify channels from a first radio access technology (RAT). In addition, a second technology scan may be performed for acquiring a first renewed service connection for the first SIM in response to determining that the first technology list was exhausted. The second technology scan may include second searches for second channels identified in a second technology list until either a first renewed service connection for the first SIM is acquired or the second technology list is exhausted. The second technology list may identify channels from a second RAT different from the most recently used RAT. A full frequency scan may be performed to acquire a first renewed service connection for the first SIM in response to determining that the second technology list was exhausted. In some embodiments, the first technology list may give priority to most recently used channels for which service was acquired for the first SIM. Alternatively, the first technology list may be sorted by age from when service was last acquired for each channel identified in a technology list.

Various embodiments may include initiating a power save mode for a predetermined period in response to determining that the first renewed service connection for the first SIM is not acquired from performing the full frequency scan. The first acquisition database scan to acquire the first renewed service connection for the first SIM may be performed while in the power save mode. In a multi-SIM device, in response to the out-of-service state being associated with the first SIM, the power save mode may end prior to the lapse of the predetermined period in response to a second SIM acquiring service. In some embodiments, the first RAT may be a most recently used RAT. In some embodiments, the first acquisition database scan may be initiated at a time based on a number of out-of-service subscriptions needing recovery on the wireless device. A limited service scan may also be performed to acquire the first renewed service connection for the first SIM with limited service in response to determining that the full frequency scan did not acquire service. In addition, the first acquisition database scan to acquire a full service connection may be performed in response to the limited service scan acquiring the limited service.

Various embodiments may have the first searches included in the first acquisition database scan being performed consecutively in an order the first channels are identified in the first technology list. A currently used channel associated with an acquired service of a second SIM within the wireless device may be first on the first technology list. Currently used channels associated with acquired services of more than one SIM within the wireless device may be first on the first technology list. In addition, the first technology list may give priority to most recently used channels for which service was acquired for the more than one SIM. The first technology list may give priority to most frequently used channels for the more than one SIM.

Various embodiments may include performing a third acquisition database scan to acquire a second renewed service connection for a second SIM in between the first acquisition database scan and the second acquisition database scan. The third acquisition database scan may be limited to channels identified in a second acquisition database associated with the second SIM. A determination may be made as to whether the second renewed service connection is acquired from the third acquisition database scan. A second full frequency scan may be performed to acquire a second renewed service connection for the second SIM in response to determining that the second renewed service connection is not acquired from the third acquisition database scan.

Various embodiments provide a method of recovering from an out-of-service state in a multi-SIM wireless device in a manner that may improve reacquisition performance in certain circumstances while conserving battery power. An acquisition database identifying at least one channel may be maintained in the wireless device. The at least one channel identified in the acquisition database may include one or more channels (e.g., a prior service connection) previously acquired by the wireless device and one or more preprogrammed channels (e.g., a list of channels broadcast by a network provider). A first acquisition database scan may also be performed to acquire a first renewed service connection for a first subscription in response to determining a first current service connection is not available for the first subscription. A determination may be made regarding whether the first renewed service connection is acquired from the first acquisition database scan. Also, a second acquisition database scan may be performed to acquire a second renewed service connection for a second subscription in response to determining a second current service connection is not available for the second subscription. A determination may be made regarding whether the second renewed service connection is acquired from the second acquisition database scan. The first and second acquisition database scans are limited to channels identified in the acquisition database. Further, a deep sleep full service scan may be performed to acquire at least one of the first renewed service connection and the second renewed service connection in response to determining that the first renewed service connection and/or the second renewed service connection is/are not acquired, and the first acquisition database scan and the second acquisition database scan are not active.

In some embodiments, the first acquisition database scan, the second acquisition database scan, and the deep sleep full service scan are consecutive. Also, the first acquisition database scan, the second acquisition database scan and the deep sleep full service scan may be interleaved together to avoid conflicts between the first subscription and the second subscription.

In some embodiments, a third acquisition database scan for a third subscription may be performed to acquire a third renewed service connection for the third subscription in response to determining a current third service connection is not active for the third subscription. The third acquisition database scans may also be limited to channels identified in the acquisition database. Also, the third acquisition database scan for a third subscription may not be performed unless the first acquisition database scan and the second acquisition database scan are both not active. Additionally, the first acquisition database scan, the second acquisition database scan, the third acquisition database scan and the deep sleep full service scan may be interleaved together to avoid conflicts between the first subscription, the second subscription and the third subscription.

In some embodiments, the deep sleep mode may be initiated for a predetermined period prior to each acquisition database scan. A default setting for that predetermined period may be 5 seconds, but that deep sleep mode predetermined period may be longer or shorter. The predetermined period may ensure that a plurality of acquisition database scans are completed within the power save mode time limit. Also, a default setting for the power save mode time limit may be 30 seconds. Similarly, that power save mode time limit may be longer or shorter than 30 seconds. Additionally, the power save mode time limit may change in response to repeated failures to renew a service connection.

In some embodiments, the first deep sleep full service scan may be limited to a first group of channels. Additionally, a determination may be made regarding whether the renewed service connection was acquired from the first deep sleep full service scan. The power save mode time limit may thus be reset in response to determining that the renewed service connection is not acquired from the first deep sleep full service scan. Also, the acquisition database scan may be repeated until at least one of the reset power save mode time limit has expired and the renewed service connection is acquired. Further, a second deep sleep full service scan may be performed to acquire the renewed service connection in response to determining that the renewed service connection was no acquired from at least one acquisition database scan and the reset power save mode time limit has expired. The first deep sleep full service scan may be limited to a first group of channels and the second deep sleep full service scan may be limited to a first group of channels, wherein the first and second groups of channels may be different.

In some embodiments, the methods may include initiating a power save mode in response to determining that the first renewed service connection is not acquired from performing the first full frequency scan, attempting to acquire full service by performing an acquisition database scan in the power save mode, determining whether full service has been acquired by performing the acquisition database scan in the power save mode, determining whether a threshold number of acquisition database scans have been performed in the power save mode in response to determining that full service has not been acquired by performing the acquisition database scan in the power save mode, ending the power save mode in response to determining that the threshold number of acquisition database scans have been performed in the power save mode, and attempting to acquire full service by performing another acquisition database scan in the power save mode in response to determining that the threshold number of acquisition database scans have not been performed in the power save mode.

Further embodiments may include a wireless device having a processor configured with processor-executable software instructions to perform various operations corresponding to the methods discussed above.

Further embodiments may include a wireless device having various means for performing functions corresponding to the method operations discussed above.

Further embodiments may include a non-transitory processor-readable storage medium having stored thereon processor-executable instructions configured to cause a processor of a wireless device to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
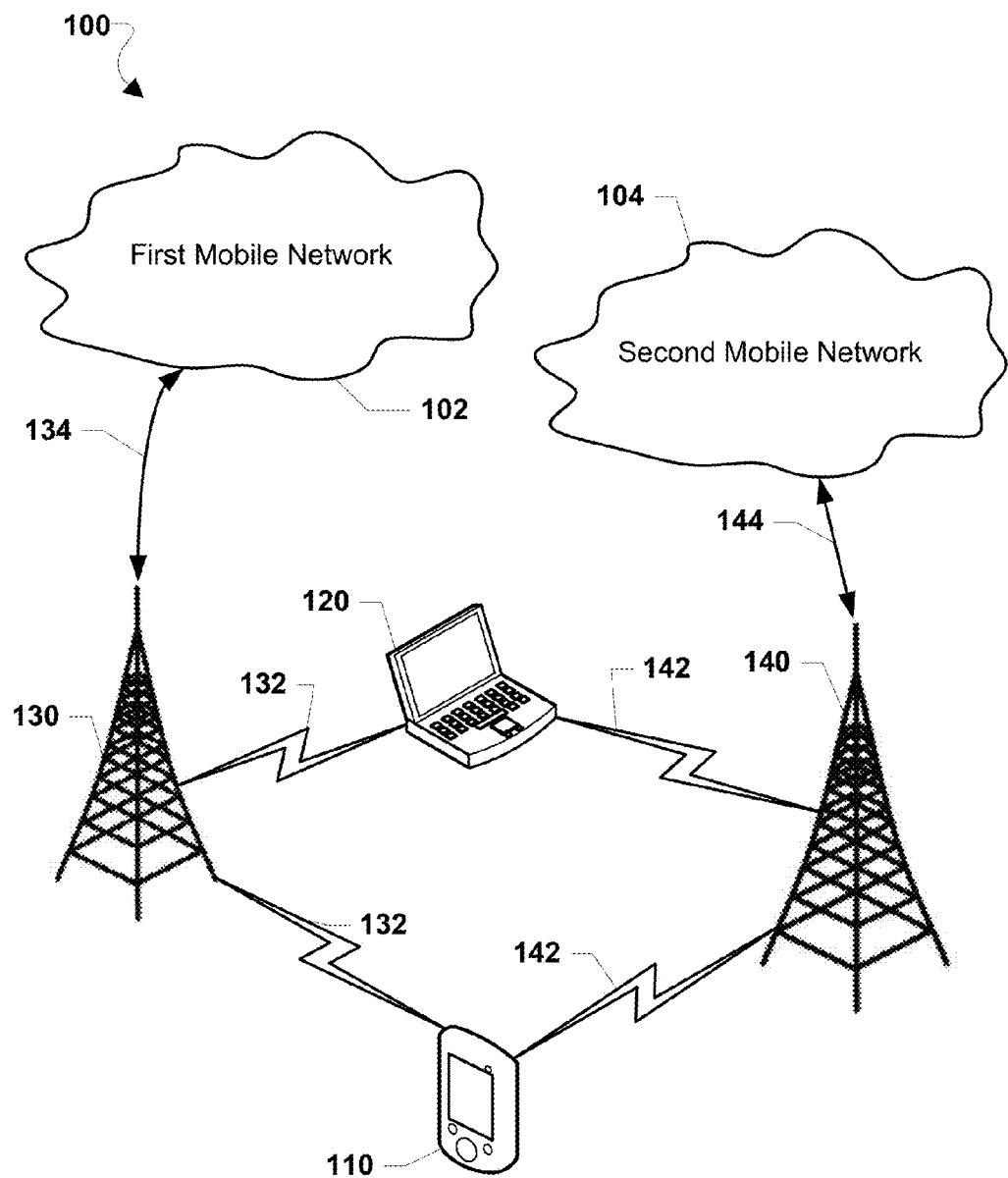
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "wireless communication device," "wireless device," and "wireless device" are used interchangeably to refer to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which include a programmable processor and memory and circuitry for connecting to mobile communication networks. A wireless device may include one or more SIM cards that enable a user to connect to one different mobile communication network (or different accounts on the same network) per SIM. The various embodiments referred to herein may be useful in any electronic device that may individually maintain one or more subscriptions to mobile communication networks through at least one radio frequency (RF) transceiver. The terms "multi-SIM wireless device" and "multi-SIM device" are used interchangeably to describe a wireless device that is configured with more than one SIM and is capable of independently handling communications with networks of all subscriptions.

As used herein, the terms "SIM", "SIM card," and "subscriber identification module" are used interchangeably to mean a memory that may be an integrated circuit, which may be embedded into a removable card or incorporated within memory of the wireless device, which stores an International Mobile Subscriber Identity, related key, and/or other information used to identify and/or authenticate the wireless device on a particular wireless network. The term SIM may also be used as shorthand reference to a communication network associated with a particular SIM, since the information stored in a SIM enables the wireless device to establish a communication link with the particular wireless network, thus the SIM and the communication network correlate to one another. Similarly, the term SIM may also be used as a shorthand reference to the protocol stack and/or modem stack and communication processes used in establishing and conducting communication services with subscriptions and networks enabled by the information stored in the SIM. For example, references to assigning a radio resource to the SIM (or granting the SIM radio access) means that the radio resource has been allocated to establishing or using a communication service with a particular network that is enabled by the information stored in that SIM.

A SIM in the various embodiments may be a Universal Integrated Circuit Card (UICC) that is configured with SIM and/or USIM applications, enabling access to one or more RATs, including a global system for mobile communication (GSM) and/or universal mobile telecommunication system (UMTS) networks. The UICC may also provide storage for a phone book and other applications. Alternatively, in a CDMA network, a SIM may be a UICC removable user identity module (R-UIM) or a CDMA subscriber identity module (CSIM). Each SIM card may have a CPU, ROM, RAM, EEPROM and I/O circuits. The SIM cards used in the various embodiments may contain user account information, an international mobile subscriber identity (IMSI), a set of SIM application toolkit (SAT) commands and storage space for phone book contacts. A micro-processing unit (MCU) of a baseband chip may interact with MCUs of SIM cards to retrieve data or SAT commands from the SIM cards installed in a wireless device. A wireless device may be immediately programmed after plugging in the SIM card. SIM cards may be also programmed to display custom menus for personalized services. A SIM card may further store a Home Public-Land-Mobile-Network (HPLMN) code to indicate the SIM card network operator provider. An Integrated Circuit Card Identity (ICCID) SIM serial number is generally printed on the SIM card for identification.

As used herein, the terms "radio access technology" and "RAT" are used interchangeably to refer to one or more underlying connection methods for a radio based communication network. Examples of a RAT include 3G, 4G, LTE, Bluetooth, and Wi-Fi. In addition a RAT may employ mobile network systems such as universal mobile telecommunications system (UMTS), global system for mobile communications (GSM), Wideband Code Division Multiple Access (WCDMA), Code division multiple access (CDMA), Time division multiple access (TDMA), or other mobile communication technologies.

Various embodiments provide devices, methods, and systems for recovering from an out-of-service state using an acquisition database in a wireless device. In particular, service signal searches may be performed with reduced power consumption when the wireless device is operating in an out-of-service state. The techniques include placing the wireless device in a "deep sleep" mode when the wireless device is not in service and has not identified a service signal. When operating in the deep sleep mode, the wireless device reduces power consumption by not searching for service signals. However, the wireless device periodically enters a wake-up period during which power consumption increases to perform service signal searches in one or more frequency bands supported by the wireless device. The wireless device periodically returns to the deep sleep mode when the signal searches are unsuccessful.

During the wake-up period, the wireless device applies search techniques designed to locate service signals efficiently with reduced power consumption. The search techniques may permit the wireless device to recover service quickly while preserving battery life. For example, the wireless device may access an acquisition database in order to first search for a service signal on channels from which service was recently acquired. This type of search limited to channels identified in the acquisition database is referred to herein as an "acquisition database scan." In addition, the acquisition database may identify channels associated with more than one RAT. In this way, an acquisition database scan may be limited to a select RAT, such as a most recently used RAT, and/or acquisition database scans may be grouped sequentially by the RAT. In addition, more than one acquisition database scan may be performed using different RATs. For example, a first acquisition database scan may include first searches for first channels identified in a first technology list from the acquisition database until either a renewed service connection is acquired or the first technology list is exhausted. Similarly, a second acquisition database scan may include second searches for second channels identified in a second technology list from the acquisition database until either a renewed service connection is acquired or the second technology list is exhausted. If service is not recovered after the acquisition database scans for the various RATs, a full frequency scan across all channels may be performed.

A full frequency scan/full service scan may involve an exhaustive search of the entire service band, and may consume a relatively large amount of time and power resources compared to an acquisition database scan. Limiting the number of times the full frequency/service scan is performed may reduce power consumption in the wireless device by reducing the amount of time the wireless device is awake. In addition, the wireless device may apply a timer to further control the times at which acquisition database scans and full frequency scans are performed. The number and timing of either the acquisition database scan or full frequency scans may be subject to a set of rules designed to reduce power consumption and thereby prolong wireless device operation. Such rules can save significant power when a wireless device leaves a service coverage area for a relatively long period, such as when driving through a remote area or entering a large shielded building.

However, there are circumstances when service is lost for a short amount of time after which full service on the previous subscription may be reacquired. For example, when a user enters an elevator, an out-of-service event may occur on the user's wireless device. During the ride up or down the building in an elevator, a number of full frequency scan acquisitions may be performed, interspersed by timed durations of deep sleep. When the doors open, service may be immediately reacquired; however, if the wireless device has entered a prolonged deep sleep period as described, the wireless device may take a minute or longer before the wireless device wakes up and performs a full frequency scan to reacquire service. Another example may involve a multi-SIM wireless device with two subscriptions. When one of those subscriptions enters an active voice call, the other subscription will likely enter an out-of-service state. Thus, once the active voice call ends on the one subscription, the other subscription will be expected to quickly reacquire service with minimum power expenditure. Various embodiments address these circumstances by interspersing the periodic full frequency scans (as described) with more frequent acquisition database scans. By more frequently scanning frequencies on which service was most recently connected, the wireless device may promptly reacquire service after the out-of-service circumstances that commonly occur in city life (e.g., from the user entering elevators, tunnels, parking garages, etc.). By performing the power efficient acquisition database scans more often than the full frequency scans, service acquisition may be improved without a significant decrease in battery life.

Various embodiments may be implemented within a variety of communication systems 100, such as at least two mobile communication networks, an example of which is illustrated in FIG. 1. A first mobile network 102 and a second mobile network 104 are typical mobile networks that include a plurality of base stations 130, 140. A first wireless device 110 may be in communication with the first mobile network 102 through a cellular connection 132 to a first base station 130. The first wireless device 110 may also be in communication with the second mobile network 104 through a cellular connection 142 to a second base station 140. The first base station 130 may be in communication with the first mobile network 102 over a connection 134. The second base station 140 may be in communication with the second mobile network 104 over a connection 144.

A second wireless device 120 may similarly communicate with the first mobile network 102 through a cellular connection 132 to the first base station 130. The second wireless device 120 may communicate with the second mobile network 104 through a cellular connection 142 to the second base station 140. The cellular connections 132, 142 may be made through two-way wireless communication links, using various RATs.

Each of the wireless devices 110, 120 may communicate with one or more of the base stations 130, 140 at a time. As each of the wireless devices 110, 120 moves through a region, the wireless devices 110, 120 may respectively terminate communication with the first base station 130 and initiate communication with the second base station 140 based on signal strength or error rate using a series of soft and hard handoffs. However, when the wireless device 110, 120 is operating out-of-service, the wireless device 110, 120 may be unable to receive service signals from any of the base stations 130, 140 within the communication system 100. For example, wireless device 110 may lose service when the wireless device 110 is outside of a service range of the base stations 130, 140, or when the wireless device 110 encounters obstacles that temporarily interrupt access to service from the base stations 130, 140. Alternatively, the wireless devices 110, 120 may seek service after being powered-up.

In order to retrieve service from the base station 130, 140, the wireless devices 110, 120 repeatedly search for a service signal on which to operate. For example, when scanning for service, the wireless device 110 may send a series of service requests on multiple bands in an effort to obtain service from one of the base stations 130, 140. Repeatedly performing service signal searches across all known frequency bands may significantly increase power consumption in a wireless device and drain available battery resources.

As described, when the wireless device 110, 120 experiences a service loss (i.e., enters an out-of-service state), the wireless device 110, 120 may be temporarily placed in a "deep sleep" mode. When operating in the deep sleep mode, the wireless device 110, 120 suspends service signal searching, and reduces power consumption by not searching for any service signals. In various embodiments, the wireless device 110, 120 may periodically enter a wake-up period, during which power consumption is increased in order to perform signal searches in one or more frequency bands supported by the wireless device 110, 120. The wireless device 110, 120 may be returned to the deep sleep mode if/when the service signal searches are unsuccessful.

In various embodiments, during the wake-up period, the wireless device 110, 120 may apply an intelligent search technique designed to locate service signals with reduced power consumption. For example, upon entering the wake-up period, the wireless device 110, 120 may first perform one or more acquisition database scans to search for a service signal. The acquisition database may include pre-loaded channels and dynamically learned channels (e.g., channels on which the wireless device 110, 120 recently or previously received or detected service). The preloaded channels may include a set of channels specified by a service provider. The dynamically learned channels may be added and updated by the wireless device 110, 120 based on historical service activity. For example, if the wireless device 110, 120 successfully obtained service on a particular channel in the past, that channel may be added to the acquisition database as a dynamically learned channel.

The frequency band in which the preloaded channels and dynamically learned channels reside may initially be given priority over other frequency bands when searching for a service signal. In some cases, priority may be given to channels from which the wireless device 110, 120 most recently obtained service. In particular, higher priority may be given to the last band group on which the wireless device 110, 120 obtained service. Using the acquisition database, the wireless device 110, 120 may narrow the service signal search based on static channel information and dynamically added historical channel information. In this manner, the wireless device 110, 120 initially focuses the search on bands that are more likely to result in successful reconnection to service. As described, the result may be greater search efficiency, and reduced power consumption.

If the acquisition database scan is initially unsuccessful, the wireless device 110, 120 may repeat this form of more limited scan a number of times, before reverting to either deep sleep mode or performing a full scan. As described, the full frequency scan may involve an exhaustive search of the entire service band associated with one or more SIMs. Also, in a multi-SIM wireless device (e.g., 110, 120), each SIM may have separate and/or distinct service bands, which may be associated with more than one RAT.

Thus, by limiting the number of times a full frequency scan is performed by each SIM, power consumption in the wireless device 110, 120 may be reducing. In some embodiments, the wireless device 110, 120 may apply a timer to further control the times at which the acquisition database scan and/or the full frequency scans are performed. Hence, the number and timing of each type of scan may be subject to a set of rules and conditions designed to reduce power consumption and thereby prolong operation of the wireless device 110, 120.

Figure 2:
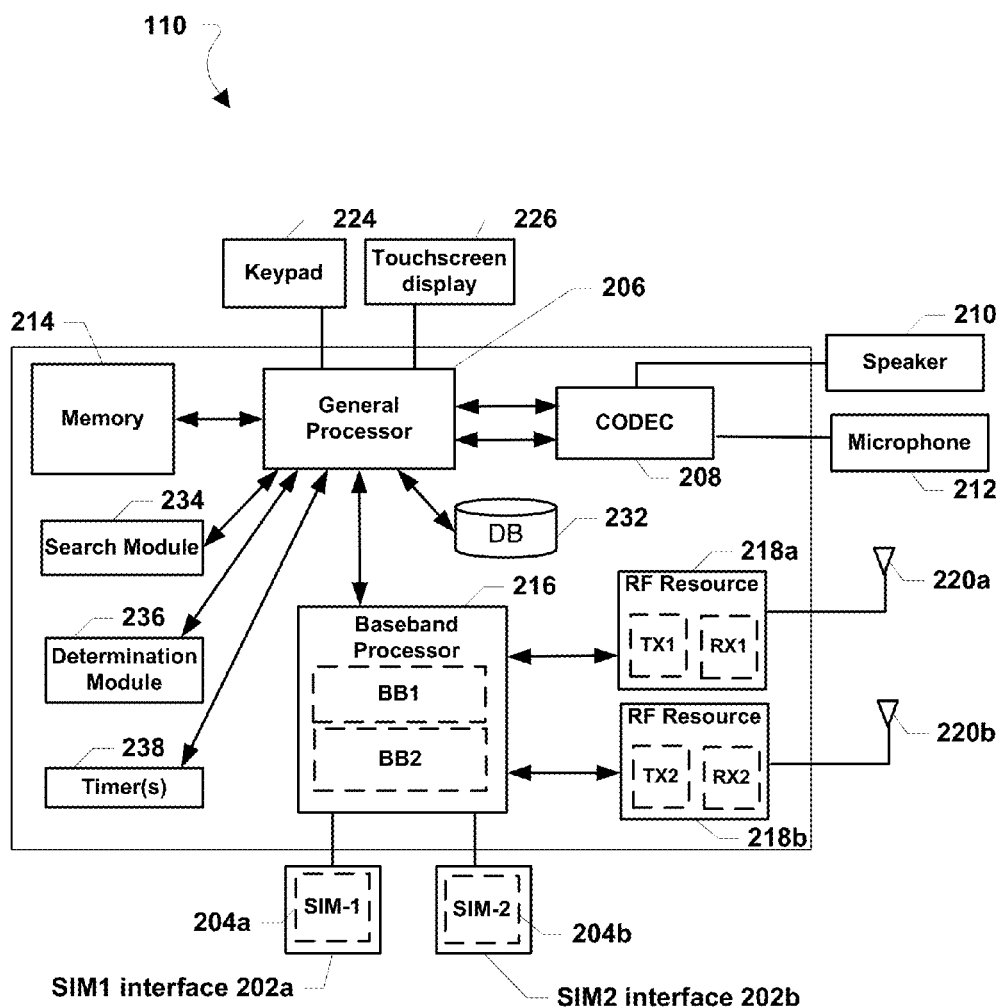
FIG. 2 is a component block diagram of a multi-SIM mobile communications device suitable for use with the various embodiments.

FIG. 2 is a functional block diagram of the wireless device 110 that is suitable for implementing the various embodiments. The wireless device 110 may include a first SIM interface 202a, which may receive a first identity module SIM-1 204a that is associated with the first subscription. The wireless device 110 may also include a second SIM interface 202b, which may receive a second identity module SIM-2 204b that is associated with the second subscription. The various embodiments are not limited to a multi-SIM device and may be implemented in a wireless device with only a single SIM, as well as more than two SIMs.

The wireless device 110 also includes at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store application data, such as an array data structure.

The general processor 206 and the memory 214 may each be coupled to at least one baseband modem processor 216. Each SIM in the wireless device 110 (e.g., SIM-1 204a and SIM-2 204b) may be associated with a baseband-RF resource chain. Each baseband-RF resource chain may include the baseband modem processor 216 to perform baseband/modem functions for communications on a SIM, and one or more amplifiers and radios, referred to generally herein as RF resources 218a, 218b. In some embodiments, baseband-RF resource chains may share a common baseband processor (i.e., a single processor that performs baseband/modem functions for all SIMs on the wireless device; e.g., 216). Alternatively, each baseband-RF resource chain may include physically or logically separate baseband processors (e.g., BB1, BB2).

The RF resources 218a, 218b may each be communication circuits or transceivers that perform transmit/receive functions for the associated SIM of the wireless device. The RF resources 218a, 218b may be communication circuits that include separate transmit and receive circuitry, or may include a transceiver that combines transmitter and receiver functions. The RF resources 218a, 218b may be coupled to a wireless antenna (e.g., a first antenna 220a and a second antenna 220b). The RF resources 218a, 218b may also be coupled to the baseband modem processor 216.

In some embodiments, the general processor 206, the memory 214, the baseband modem processor(s) 216, and the RF resources 218a, 218b may be included in the wireless device 110 as a system-on-chip. In some embodiments, the first and second SIMs 204a, 204b and corresponding SIM interfaces 202a, 202b may be external to the system-on-chip. Further, various input and output devices may be coupled to components on the system-on-chip, such as interfaces or controllers. Example user input components suitable for use in the wireless device 110 may include, but are not limited to, a keypad 224 and a touchscreen display 226.

In some embodiments, the keypad 224, the touchscreen display 226, the microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless device 110 to enable communication between them, as is known in the art.

The wireless device 110 may also includes an acquisition database 232 (i.e., DB), a search module 234, a determination module 236, one or more timers 238 (e.g., a no service timer or a power save mode timer) and/or a power supply (not shown). The power supply may be battery-powered, although the techniques described herein may be applicable to wireless devices that are not battery-powered.

When either of the SIMs 204a, 204b is in an out-of-service state, the respective antenna 220a, 220b receives no service signals transmitted from base stations on frequency bands supported by the respective SIM 204a, 204b. For example, either of the SIMs 204a, 204b may experience a service loss during normal operation, or may be unable to find a service signal upon power-up. Loss of service may occur when the wireless device 110 travels outside the service area of a primary public land mobile network (PLMN) or any other PLMNs operated on frequency bands supported by the particular SIM 204a, 204b.

The determination module 236 may be primarily responsible for determining the technology, channels, and/or service provider that the wireless device 110 should use. The determination module 236 is also capable of determining when the wireless device 110, or at least one SIM thereof (e.g., 204a, 204b), is operating out-of-service. The search module 234 sends service requests to the general processor 206. The general processor 206 then controls the respective RF resource 218a, 218b that is used to transmit the service requests via the respective antenna 220a, 220b to any nearby base station. For example, the service requests may include a full service request, a limited service request or an acquisition database service request. The full service request seeks normal mode service from any available base station. If normal mode service is not available, then a limited service request may seek limited services from any available base station. Limited services may include emergency wireless services. An acquisition database service request seeks service from channels saved in the acquisition database. The service requests identify one or more frequency bands supported by the respective SIMs 204a, 204b to perform a service signal search.

The general processor 206 is primarily responsible for lower layer signaling of the wireless device 110 and controlling how the wireless device 110 operates in a specific mode (e.g., a deep sleep mode, power save mode, idle/connected mode). Upon receiving service requests from the search module 234, the general processor 206 may perform a scan on the frequency bands identified in the service requests. If the scan is unsuccessful in acquiring a service signal on which to operate, the general processor 206 may perform another scan using the same service request, a different service request or revert to a deep sleep mode.

The acquisition database 232 may store preloaded channels, dynamically learned channels, or a combination of both. A communication service provider may provide the preloaded channels into the acquisition database 232 during programming of the wireless device 110 or the SIMs 204a, 204b individually. The preloaded channels may comprise common channels known to provide quality service signals. Also, the dynamically learned channels may comprise channels on which the wireless device 110, or the SIMs 204a, 204b individually, previously received service, and may be dynamically added to the acquisition database 232 by the general processor 206 during normal usage of the wireless device 110.

The general processor 206 may direct the search module 234 to perform a frequency scan for full service or limited service. The full service frequency scan (also referred to herein as simply a "full service scan") may be followed by a limited service frequency scan (also referred to herein as simply a "limited service scan"), if necessary. If the full service scan and limited service scan are unsuccessful, the general processor 206 may direct the search module 234 to perform one or more acquisition database 232 scans. In each case, the search module 234 searches for a service signal on each channel of the frequency bands identified in the pertinent service request.

If none of the service signal searches are successful, the general processor 206 may place all of the SIMs 204a, 204b of the wireless device 110 or an individual SIM in a deep sleep mode and/or a power save mode. During the deep sleep mode, the general processor 206 reduces power consumption by not performing service signal searches for the out-of-service SIM(s). One or both of the SIMs 204a, 204b may remain in the deep sleep mode for a predefined deep sleep period. During the power save mode, the general processor 206 reduces power consumption by periodically performing service signal searches for the out-of-service SIM(s), but limiting those searches to channels identified in the acquisition database (i.e., acquisition database scans). One or both of the SIMs may remain in the power save mode for a predefined power save mode period. Also, the general processor 206 may periodically initiate wake-up periods by increasing power in the wireless device 110. The power save mode may include intervals of deep sleep, as well as limited wake up periods. For example, the general processor 206 may instruct a power supply (not shown) to provide additional battery power to the general processor 206 after operating the wireless device 110 in the deep sleep mode for the predefined deep sleep mode period.

Upon entering a wake-up period, the search module 234 again sends service requests to the general processor 206. As described, the service requests may identify one or more frequency bands supported by the wireless device 110 in which to perform a service signal search.

The general processor 206 performs one or more service signal searches in the supported frequency bands in response to the received service requests. When performing the service signal searches, the antenna 220a, 220b associated with the active SIM sends outgoing signals, such as service request signals to a base station. When the service signal searches fail to detect a service signal on which to operate, the general processor 206 returns a no service signal indication to the determination module 236, in which case the wireless device 110 may either perform additional searches, enter a power save mode, or enter an extended deep sleep mode.

When a service signal is found, the general processor 206 returns the service signal indication to the search module 234, indicating that service is available. The antenna 220a, 220b in question may then receive incoming signals, such as paging signals and pilot signals transmitted from the connected base station. The RF resources 218a, 218b include circuitry to process received signals and output digital values. Consistent with conventional wireless devices, the RF resources 218a, 218b may process the received signal using a low-noise amplifier (LNA), an RF mixer and an analog-to-digital (A/D) converter and other suitable components (not shown) to produce corresponding digital values.

As described, full service scans consume a relatively large amount of time and power resources compared to acquisition database scans. For example, an acquisition database 232 scan may take between approximately 0.03 seconds and 0.2 seconds to complete. In contrast, a full service scan may take 1-2 minutes to complete. Thus, limiting the frequency and number of times the general processor 206 performs full service scans, may reduce power consumption in the wireless device 110.

Figure 3A:
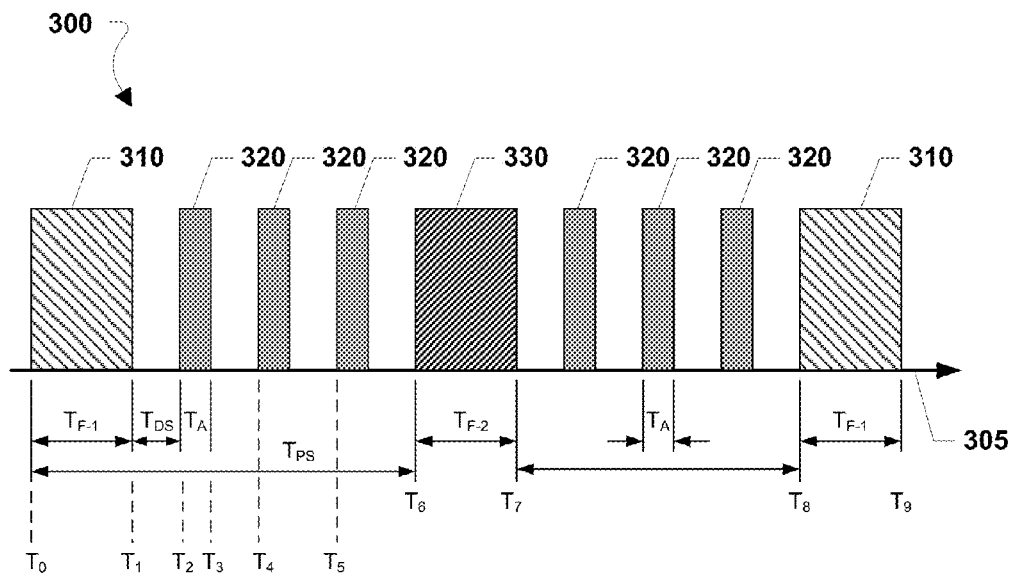
FIG. 3A is a signaling sequence diagram illustrating communication activities interspersed with power save mode operations in an embodiment mobile communications device.

FIG. 3A illustrates a sequence of service acquisition scans 300 of an RF chain in a wireless device (e.g., 110) attempting to recover from an out-of-service state. The sequence of service acquisition scans 300 corresponds to a timeline 305 of activity of the RF chain. The bars represent periods of service scan activity on the RF chain. A first deep sleep full service scan 310 may attempt to scan all channels associated with a particular RAT, such as (but not limited to) UMTS, or limited to an initial select channel group. Alternatively, the first deep sleep full service scan 310 need not be limited to channels associated with a particular RAT or group and may include all channels and protocols supported on the wireless device. The first deep sleep full service scan 310 occurs for a first full service scan period $T_{F-4}$ between time $T_0$ and $T_1$.

A second deep sleep full service scan 330 may attempt to scan all channels associated with a different RAT, such as (but not limited to) GSM, or limited to a subsequent predetermined select channel group different from the initial select channel group. The second deep sleep full service scan 330 need not be limited to channels associated with a particular technology protocol or group and in various embodiments may include all channels and all communication technologies and protocols supported on the wireless device. In this way, the first deep sleep full service scan 310 and the second deep sleep full service scan 330 may scan the same channels or different channels. The second deep sleep full service scan 330 occurs for a second full service scan period $T_{F-2}$ between time $T_6$ and $T_7$. Additionally, between the first and second deep sleep full service scans 310, 330, several acquisition database scans 320 may be performed. Each of the acquisition database scans 320 occurs for an acquisition scan period $T_A$. Before and after each acquisition database scan 320 the wireless device is in a deep sleep period $T_{DS}$. Additionally shown is a power save period $T_{PS}$, which may extend from the beginning of the first deep sleep full service scan 310 to the beginning of a second deep sleep full service scan 330. The sequence shown may be repeated as needed, with the first deep sleep full service scan 310 on the right in FIG. 3A representing the beginning of the next cycle.

FIG. 3A illustrates an example of the wireless device 110 attempting full frequency scans (e.g., 310) followed by limited frequency scans (e.g., 320) on the last active band for four wakeup cycles before attempting a full frequency scan (e.g., 330) on an alternative band in the every fifth wake up cycle. The power save mode cycles may be 30 seconds for the first 10 cycles, then 45 seconds for the second 10 cycles, then 60 seconds for each cycle and so on. Alternatively, other telescoping sequences, such as 20/40/60 seconds may be used for consecutive cycle groups. During the power save mode, the acquisition database scan 320 may be triggered for the recently camped on RAT and PLMN.

According to various embodiments, the acquisition database scans 320 for one SIM subscription should not interrupt full or limited frequency scans by another SIM subscription. To avoid this, the acquisition database scans 320 may be assigned a lower priority than those other scans for scheduling purposes. Also, the acquisition database scans 320 may be scaled by the number of subscriptions that are out-of-service so that the frequency and power consumption level of the acquisition database scans 320 remains the same across all out-of-service SIMs of the multi-SIM wireless device.

Figure 3B:
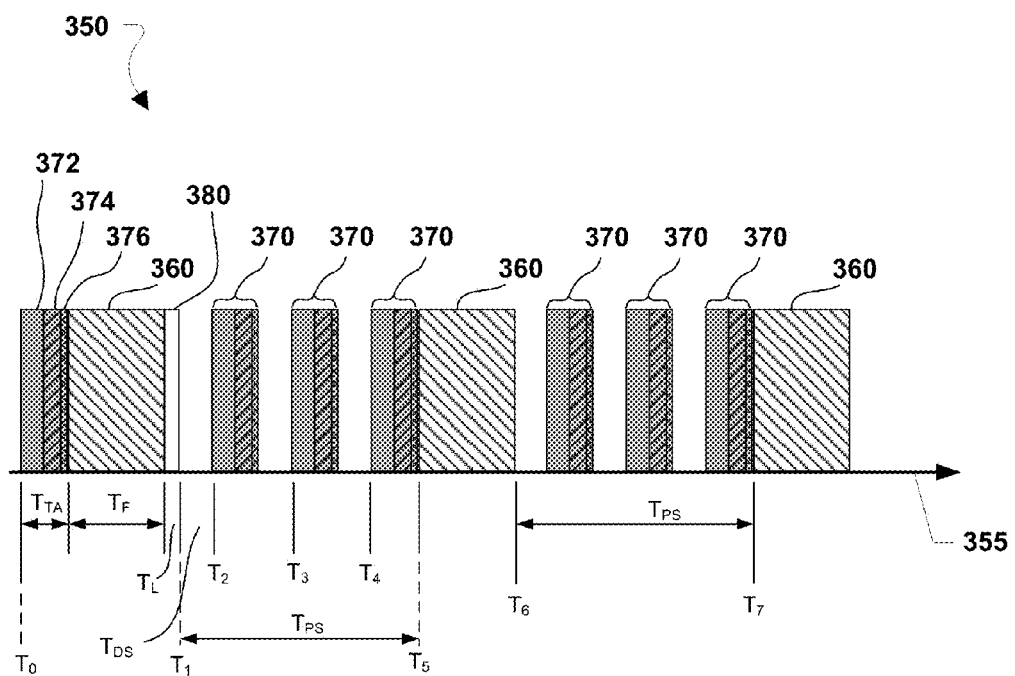
FIG. 3B is a signaling sequence diagram illustrating communication activities interspersed with power save mode operations in an embodiment mobile communications device.

FIG. 3B illustrates a sequence of service acquisition scans 350 of an RF chain in a wireless device (e.g., 110) attempting to recover from an out-of-service state in accordance with various embodiments. With reference to FIGS. 1-3B, the sequence of service acquisition scans 350 corresponds to a timeline 355 of activity of the RF chain. The bars represent periods of service scan activity on the RF chain. The sequence shown may be repeated as needed. In response to determining that the wireless device is operating in an out-of-service state, a first acquisition database scan 372 may be performed to acquire a renewed service connection. The first acquisition database scan 372 may search channels consecutively using a first set of channels identified in a first technology list from an acquisition database until either a renewed service connection is acquired or the first technology list is exhausted. The first technology list may identify channels used by or available to a most recently used RAT.

In response to determining that the first technology list was exhausted, a second acquisition database scan 374 may be performed to acquire a renewed service connection. The second acquisition database scan 374 may search channels consecutively using a second set of channels identified in a second technology list from the acquisition database until either a renewed service connection is acquired or the second technology list is exhausted. In response to determining that the second technology list was exhausted, a third acquisition database scan 376 may be performed to acquire a renewed service connection. The third acquisition database scan 376 may search consecutively using third channels identified in a third technology list from the acquisition database until either a renewed service connection is acquired or the third technology list is exhausted. Although the first, second, and third acquisition database scans 372, 374, 376 are illustrated in this embodiment, fewer or additional acquisition database scans may be included to ensure channels from all RATs included in the acquisition database are scanned for service. A total period for all the acquisition database scans is denoted as the acquisition scan period $T_{TA}$. In some embodiments, the acquisition scan period $T_{TA}$ may be similar to the acquisition scan period $T_A$ (see, e.g., FIG. 3A).

In response to the first, second, and third acquisition database scans 372, 374, 376 (collectively indicated in FIG. 3B as 370) being unsuccessful, a deep sleep full service scan 360 may attempt to scan all channels associated with a particular RAT, such as (but not limited to) UMTS, or limited to an initial select channel group. Alternatively, the deep sleep full service scan 360 need not be limited to channels associated with a particular RAT or group and may include all channels and protocols supported on the wireless device. The deep sleep full service scan 360 occurs for a full service scan period $T_F$.

In response to the deep sleep full service scan 360 being unsuccessful, a limited service scan 380 may attempt to acquire a renewed service connection with limited service. Limited service may include a connection using forbidden channels or channels that do not provide a full complement of service capabilities. The limited service scan 380 occurs for a limited service scan period $T_L$. Alternatively, if no limited service channels are known or accessible to the wireless device, the limited service scans may be skipped and thus not performed.

A power save mode may be initiated at time $T_1$ and last for a predetermined period $T_{PS}$ in response to determining that the renewed service connection is not acquired from the earlier scans. If there were no limited service channels for which to scan, then time $T_1$ may coincide with the end of the deep sleep full service scan 360. Initially, as part of the power save mode, the wireless device may operate in a deep sleep for a shorter predetermined deep sleep period $T_{DS}$. At the end of the deep sleep period $T_{DS}$, at time $T_2$, the wireless device may once again perform acquisition database scans 370. In response to the acquisition database scans 370 not acquiring service and if there is still time remaining in the predetermined period $T_{PS}$, the wireless device may enter another deep sleep period $T_{DS}$. If during any one of the above-mentioned scans, full service is acquired, the wireless device may exit the power save mode, even prior to the lapse of the predetermined period $T_{DS}$. A cycle of repeating the acquisition database scans 370 and deep sleep periods $T_{DS}$ may continue in a loop until the predetermined period $T_{PS}$ has ended. In response to the predetermined period $T_{PS}$ ending, another deep sleep full service scan 360 may be performed. However, if the deep sleep full service scan 360 does not acquire service, the wireless device may once again enter power save mode and repeat alternating the deep sleep full service scans 360 and acquisition database scans 370 as described.

Figure 4A:
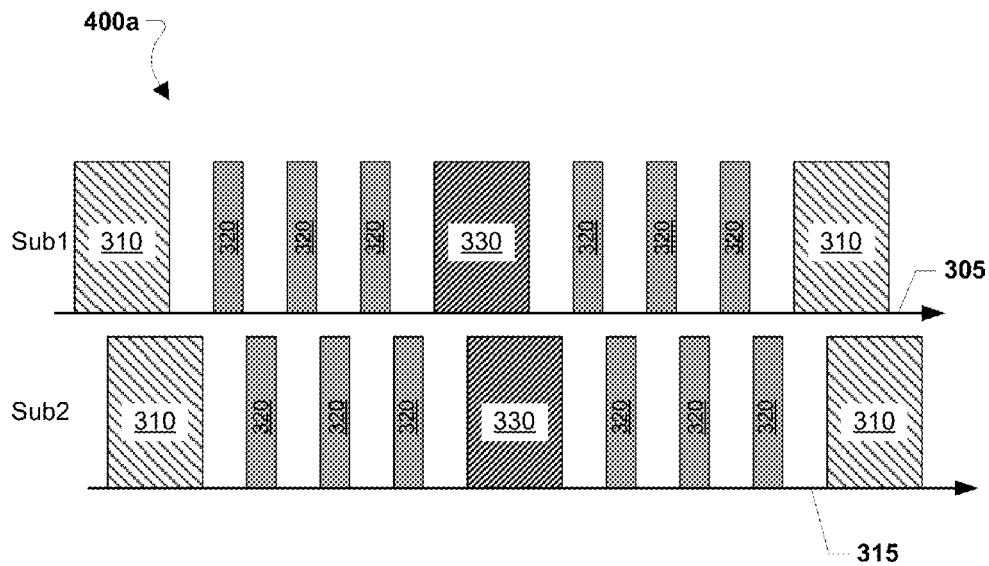
FIG. 4A is a signaling sequence diagram illustrating power save mode operations by two SIMs on a multi-SIM mobile communications device that are uncoordinated.

FIG. 4A illustrates a sequence of service acquisition scans 400a illustrating uncoordinated power save mode operations between two SIM subscriptions Sub1, Sub2 in an embodiment wireless device (e.g., 110 in FIGS. 1-2). When more than one SIM is in an out-of-service state, the scans performed in an attempt to recover service may extend the overall scan time of the wireless device. Also, if the scans are not coordinated, the scans may overlap and either block or interfere with one another, which may further increase the acquisition delay for each subscription. For a multi-SIM wireless device, having two or more SIMs enabling multiple subscriptions but only one transceiver, the overlap causes a direct conflict. This conflict is represented in FIG. 4A by the timelines 305, 315, which are concurrent and have the service acquisition scans 400a scheduled to occur at the same time and/or overlap in the period in which the service acquisition scans 400a occur.

Figure 4B:
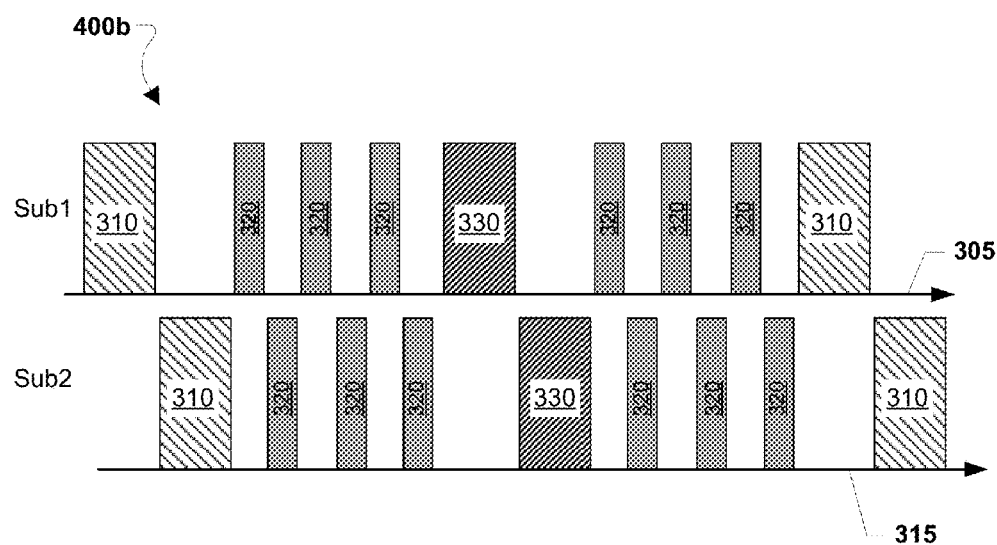
FIG. 4B is a signaling sequence diagram illustrating power save mode operations by two SIMs that are coordinated according to embodiments implemented on a multi-SIM mobile communications device.

FIG. 4B illustrates a sequence of service acquisition scans 400b illustrating coordinated power save mode operations between two SIM subscriptions Sub1, Sub2 in an embodiment wireless device (e.g., 110 in FIGS. 1-2). By coordinating the timing of the service acquisition scans 400b between the two subscriptions Sub1, Sub2, the wireless device may avoid collisions in out-of-service recovery attempts. In this way, the out-of-service recovery scans may be scheduled to occur in alternating intervals, so each subscription Sub1, Sub2 takes turns. Thus, this method takes advantage of the deep sleep periods between scans for each subscription. A lack of conflict is represented in FIG. 4B by the timelines 305, 315 having the service acquisition scans 400b scheduled to not occur at the same time and/or to overlap in time.

The acquisition database scans 320, as well as the deep sleep full service scans 310, 330 may be interleaved together to avoid conflicts between the first subscription and the second subscription. In various embodiments, the term "interleaved" refers to mixing things, such as cycles or periods, in an alternating pattern. For example, each SIM may be configured to use more than one type of sleep cycle, in which a first sleep cycle includes the awake period, and a second sleep cycle does not include the awake period. The first and second sleep cycles of the respective SIMs may be coordinated so that the SIMs alternate sleep cycles that include the awake period. In this way, the respective awake periods and the sleep cycles that include the awake periods may be interleaved so both SIMs do not have overlapping awake periods. Also, the first acquisition database scan, the second acquisition database scan, and the deep sleep full service scan may be consecutive or in another sequence designed to ensure the service acquisition scans 400b avoid conflicts between the subscriptions.

In some embodiments, each subscription Sub1, Sub2 may coordinate a timing by setting the value of an acquisition database scan timer. In this way, when each subscription Sub1, Sub2 enters deep sleep mode, an acquisition database scan timer is set. Also, by knowing the approximate duration of the acquisition database scans, the deep sleep modes for the respective subscriptions Sub1, Sub2 may be coordinated to coincide with activity on the other subscription. Additionally, the same coordinated out-of-service recovery acquisition scans may be extended to more than two SIMs.

Figure 4C:
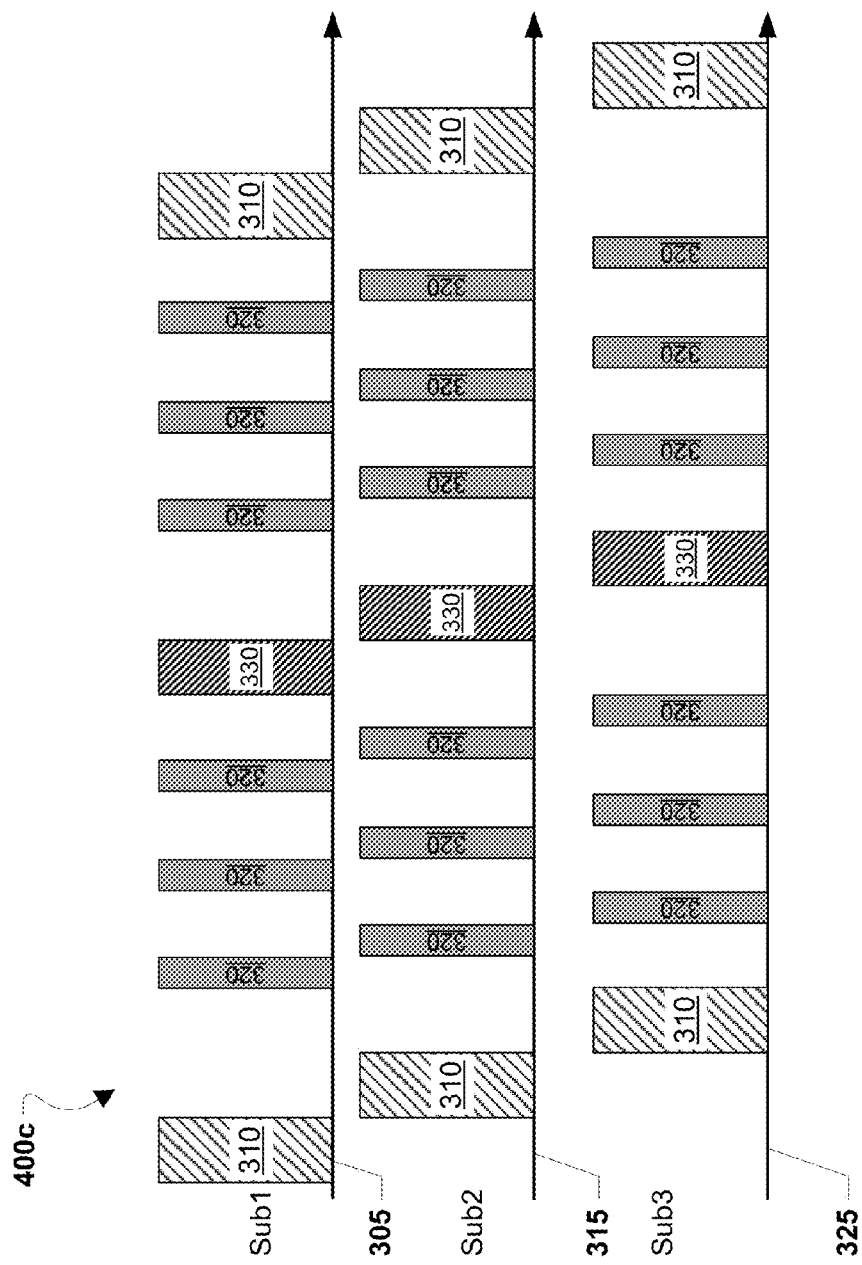
FIG. 4C is a signaling sequence diagram illustrating power save mode operations by three SIMs that are coordinated according to embodiments implemented on a multi-SIM mobile communications device.

FIG. 4C illustrates a sequence of service acquisition scans 400c illustrating coordinated power save mode operations between three SIM subscriptions Sub1, Sub2, Sub3 in an embodiment multi-SIM wireless device (e.g., 110 in FIGS. 1-2). A lack of conflict is represented in FIG. 4C by the timelines 305, 315, 325 having the service acquisition scans 400c scheduled to not occur at the same time and/or overlap in time. Although the out-of-service scan scheduling becomes more complex, such scheduling avoids conflicts.

In order to coordinate the service acquisition scans, some system variables may be helpful to determine. The acquisition database scan 320 duration is one such variable, which may be measured by the interval between two consecutive acquisition database scans. Also, the deep sleep period telescoping time patterns (e.g., 30/45/60 seconds) are also variables that may be determined and/or programmed. Additionally, there are internal variable constraints, such as the number of out-of-service subscriptions needing recovery (referred to herein as the "Noos-sub"). Another variable is the maximum time used for an acquisition database scan 320 to be completed (referred to herein as the TA-Max). Additionally, timers may be maintained to track how long a subscription is kept in deep sleep mode (referred to herein as "Tsleep") or a timer for triggering when a particular acquisition database scan 320 may be initiated (referred to herein as "TA-Start").

For each subscription, the various parameters may be known and/or set. For example, the value of TA-Start may be set to Noos-sub multiplied by the acquisition database scan 320 duration. Also, this value may be updated when Noos-sub changes. Upon entering deep sleep, the TA-Start timer may be started if the current time, plus the TA-Start timer value, plus the TA-Max is less than the next deep sleep wakeup time. Upon the expiration of the TA-Start timer, an acquisition database scan 320 may be triggered for the corresponding technology (i.e., the RAT). When the attempt to acquire service using the acquisition database scan is unsuccessful, the TA-Start timer may be started if the current time plus the value on the TA-Start timer plus Value TA-Max is less than the next deep sleep wakeup time. Also, if the acquisition database scan 320 is in progress when the wireless device wakes up from a deep sleep, the processor of the wireless device may abort the current acquisition database scan and trigger a full service scan or an extension of a deep sleep scan, until the completion of the acquisition database scan.

Figure 5:
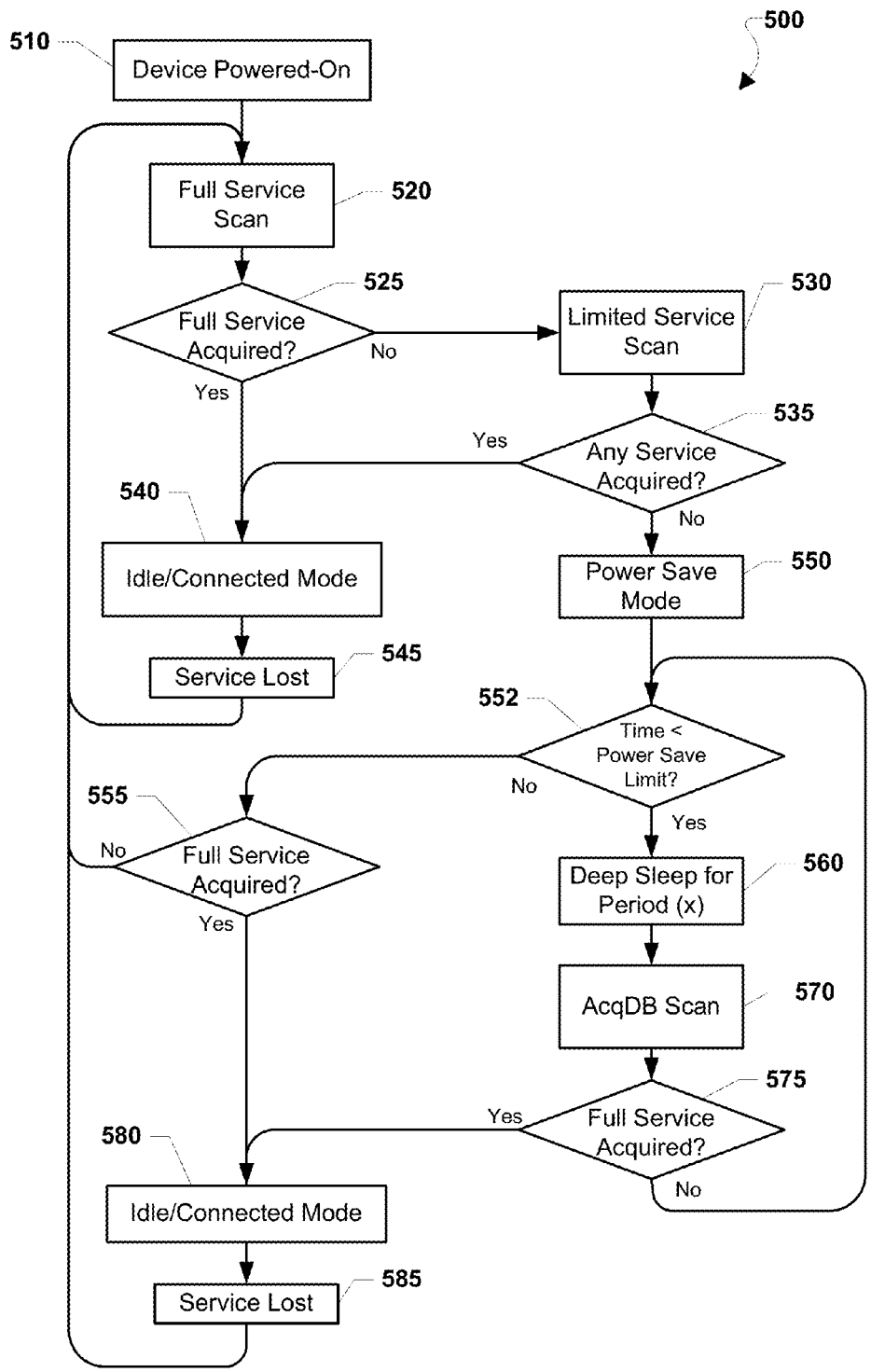
FIG. 5 is a process flow diagram illustrating method for out-of-service recovery using an acquisition database according to various embodiments.

FIG. 5 illustrates a method 500 of recovering from an out-of-service state in a wireless device (e.g., 110, 120, in FIGS. 1-2) according to various embodiments. The method 500 may be performed by a processor of the wireless device (e.g., 206, 216 of FIG. 2). With reference to FIGS. 1-5, the method 500 may be initiated when the wireless device is powered on in block 510. Thereafter, until the wireless device is powered-down the processes of the method 500 may continue in one or more of the process loops as described.

In block 520, the wireless device processor may perform a full service scan. In determination block 525, the wireless device processor may determine whether full service is acquired as a result of the full service scan. In response to determining that full service is not acquired as a result of the full service scan (i.e., determination block 525="No"), the wireless device processor may perform a limited service scan in block 530. In response to determining that full service is acquired as a result of the full service scan (i.e., determination block 525="Yes"), the wireless device processor may enter an idle/connected mode in block 540. Once in idle/connected mode, if the acquired service is subsequently lost in block 545, the wireless device processor may perform another full service scan in block 520. In determination block 535, the wireless device may determine whether any service (i.e., full or limited) is acquired as a result of the limited service scan. In response to determining that service is not acquired because of the limited service scan (i.e., determination block 535="No"), the wireless device processor may be placed in a power save mode in block 550. In response to determining that any service is acquired because of the limited service scan (i.e., determination block 535="Yes"), the wireless device may enter the idle/connected mode in block 540. If such service is subsequently lost in block 545, the wireless device may again perform a full service scan in block 520.

The power save mode, in block 550, may enable the wireless device to reduce power consumption related to searching for service. The power save mode may include intervals of deep sleep mode along with acquisition database scans. Initially, the power save mode uses a system timer to track continuous periods during which the wireless device remains in power save mode. In this way, a power save mode time limit may be designated for the duration that the wireless device remains in the power save mode. The power save mode time limit may be configurable and set with a default value. Also, the power save mode time limit may be fixed or change over time or in response to a repeated failure to acquire a full service connection.

In determination block 552, the wireless device processor may determine whether the power save time limit has elapsed. In response to determining that the power save time limit has elapsed (i.e., determination block 552="No"), the wireless device processor may check whether full service has been acquired in the interim in determination block 555. In response to determining that full service is acquired after or at the point that the power save time limit has elapsed (i.e., determination block 555="Yes"), the wireless device processor may enter the idle/connected mode in block 580, and perform a full service scan in block 520 if service is subsequently lost in block 585. In response to determining that full service is not acquired after the power save time limit has elapsed (i.e., determination block 555="No"), the wireless device may return to a full service scan in block 520, for the at least one out-of-service SIM.

Until the power save mode time limit expires, the wireless device processor may perform periodic acquisition database scans interspersed with abbreviated deep sleep mode periods there between. Thus, in response to determining that the power save time limit has not elapsed (i.e., determination block 552="Yes"), the wireless device or at least one RF chain associated with a SIM may be placed in deep sleep mode for a predetermined period x in block 560. The predetermined period x may be a shorter time than a traditional deep sleep mode, which can last from 30 to 60 seconds. In this way, the predetermined period x may be, for example, approximately 3 seconds, which may be tracked by a system time. After the predetermined period x elapses, an acquisition database (i.e., AcqDB) scan is performed in block 570. In response to determining that service is acquired as a result of the acquisition database scan (i.e., determination block 575="Yes"), the wireless device processor may enter the idle/connected mode in block 580, and may perform a full service scan in block 520 if service is subsequently lost in block 585. In response to determining that service is not acquired as a result of the acquisition database scan (i.e., determination block 575="No"), the wireless device processor may return to determination block 552 to check whether the power save mode timer has elapsed.

Alternatively, rather than setting a power save mode time limit, a counter may track and limit the number of acquisition database scans that are performed. In such embodiments, once a threshold number of acquisition database scans have been performed in the power save mode, the wireless device processor may perform the determination in determination block 555 as described.

Figure 6:
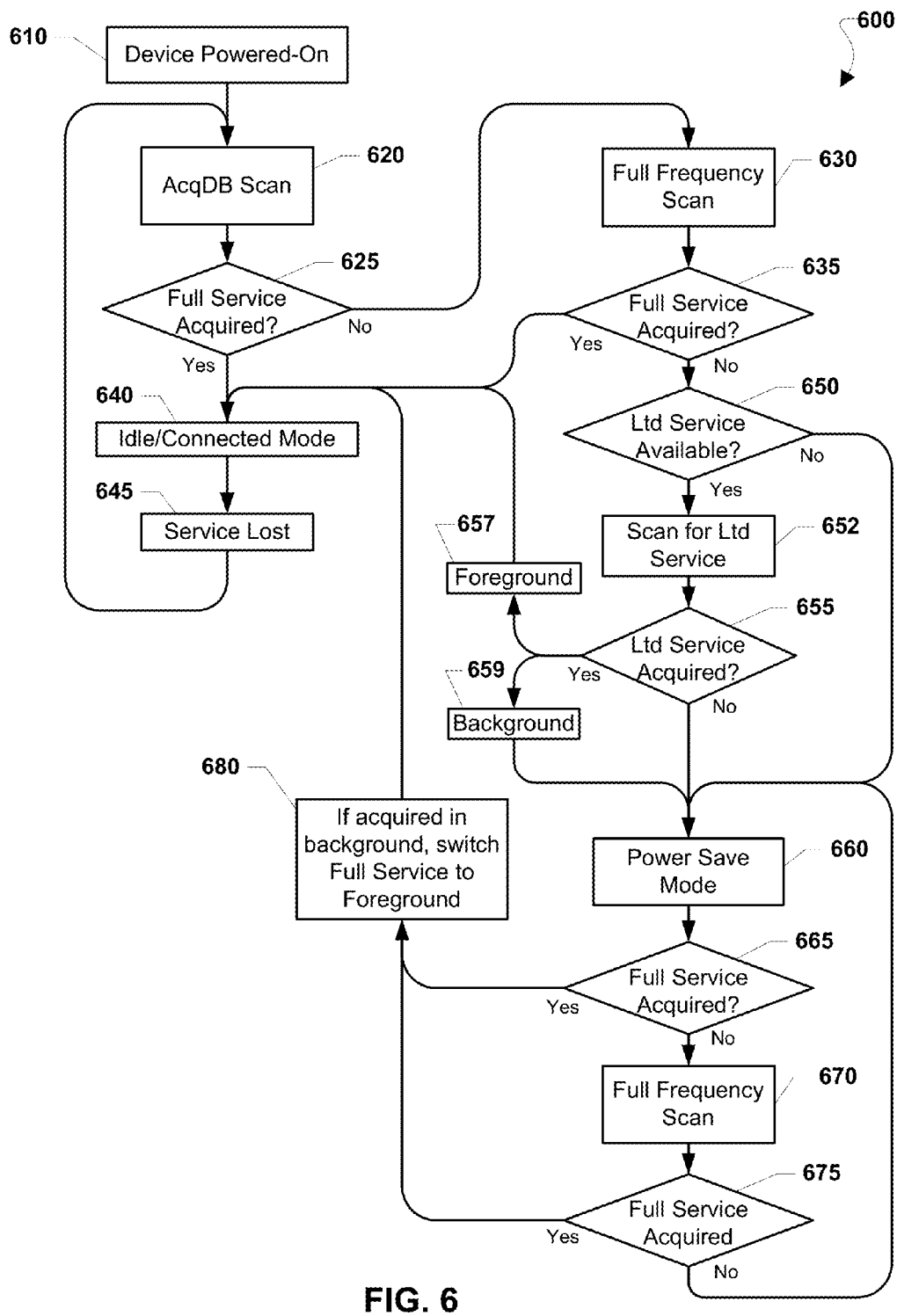
FIG. 6 is a process flow diagram illustrating another method for out-of-service recovery using an acquisition database according to various embodiments.

FIG. 6 illustrates another method 600 of recovering from an out-of-service state in a wireless device (e.g., 110, 120, in FIGS. 1-2) according to various embodiments. The method 600 may be performed by a processor of the wireless device (e.g., 206, 216 of FIG. 2). With reference to FIGS. 1-6, the method 600 may be initiated when the wireless device is powered on in block 610. Thereafter, until the wireless device is powered-down the processes of the method 600 may continue in one or more of the process loops as described.

In block 620, the wireless device may perform at least one acquisition database (AcqDB) scan to acquire a renewed service connection. Acquisition database scans according to some embodiments are described in more detail with reference to FIG. 7. Returning to FIGS. 1-6, in determination block 625, the wireless device processor may determine whether full service is acquired as a result of the acquisition database scan. In response to determining that full service is not acquired because of the acquisition database scan (i.e., determination block 625="No"), the wireless device may perform a full frequency scan in block 630. Full frequency scans according to some embodiments are described in more detail with reference to FIG. 8. Returning to FIGS. 1-6, in response to determining that full service is acquired because of the acquisition database scan (i.e., determination block 625="Yes"), the wireless device may enter an idle/connected mode in block 640. Once in idle/connected mode, if that acquired service is subsequently lost in block 645, the wireless device may perform another acquisition database scan in block 620.

In determination block 635, the wireless device processor may determine whether full service is acquired as a result of the full frequency scan. In response to determining that full service is acquired as a result of the full frequency scan (i.e., determination block 635="Yes"), the wireless device processor may enter an idle/connected mode in block 640, and if the acquired service is subsequently lost in block 645, the wireless device may perform another acquisition database scan in block 620.

In response to determining that full service is not acquired as a result of the full frequency scan (i.e., determination block 635="No"), the wireless device processor may determine whether limited service may be available in determination block 650. Limited service may include a connection using forbidden channels or channels that do not provide a full complement of service capabilities. In response to determining that limited service is not available (i.e., determination block 650="No"), the wireless device may enter a power save mode in block 660. In response to determining that limited service is available (i.e., determination block 650="Yes"), the wireless device may perform a scan for such limited service in block 652. A limited service scan may be similar to acquisition database scans, but restricted to limited service channels rather than using one or more search lists generated from the acquisition database. In response to determining that limited service is acquired as a result of the scan for limited service (i.e., determination block 655="Yes"), the wireless device may branch processes into foreground operations in block 657 and background operations in block 659. Branching of operations may alleviate the less than optimal connection provided by the limited service.

The foreground operations in block 657 may include registering the limited service followed by entering an idle/connected mode in block 640. If that acquired limited service is subsequently lost in block 645, the wireless device may perform another acquisition database scan in block 620. The background operations starting in block 659 may be terminated or take over the foreground operations, particularly if the limited service connection is lost in block 645. In this way, if the acquired limited service is subsequently lost, the background processes initiated in block 659 may be terminated or optionally switched to operate in the foreground in order to eliminate redundant service acquisition attempts or processes.

Regardless of whether limited service is available and/or acquired, the wireless device may enter a power save mode in block 660. In response to determining that limited service is not acquired (i.e., determination block 655="No"), the processor may enter the power save mode in block 660 without a parallel background process. In response to determining that limited service is acquired (i.e., determination block 655="Yes"), the power save mode in block 660 may occur as a background process with a parallel foreground process in block 657 as described. A power save mode according to some embodiments are described in more detail with reference to FIG. 9. Returning to FIGS. 1-6, when in the power save mode in block 660 as part of the background operations, the wireless device may remain in an idle/connected mode in block 640 on the acquired limited service as part of the foreground operations.

In determination block 665, the wireless device processor may determine whether full service is acquired as a result of the power save mode. In response to determining that full service is not acquired as a result of the power save mode (i.e., determination block 665="No"), the wireless device processor may perform a full frequency scan in block 670 (e.g., as described with reference to FIG. 8).

In response to determining that full service is acquired as a result of the power save mode (i.e., determination block 665="Yes"), the wireless device may enter an idle/connected mode in block 640. Once in the idle/connected mode, if that acquired service is subsequently lost in block 645, the wireless device processor may perform another acquisition database scan in block 620.

In determination block 675, the wireless device processor may determine whether full service is acquired as a result of the full frequency scan. In response to determining that full service is not acquired as a result of the full frequency scan (i.e., determination block 675="No"), the wireless device may return to a power save mode in block 660.

In response to determining that full service is acquired as a result of the power save mode (i.e., determination block 665="Yes") or as a result of the full frequency scan (i.e., determination block 675="Yes"), the wireless device processor may enter an idle/connected mode in block 640. In addition, if that full service was acquired as part of a background mode process, in block 680 the acquired full service connection may be switched to the foreground, taking over the limited service connection, as described. Once in an idle/connected mode, if that acquired service is subsequently lost in block 645, the wireless device processor may perform another acquisition database scan in block 620.

Figure 7:
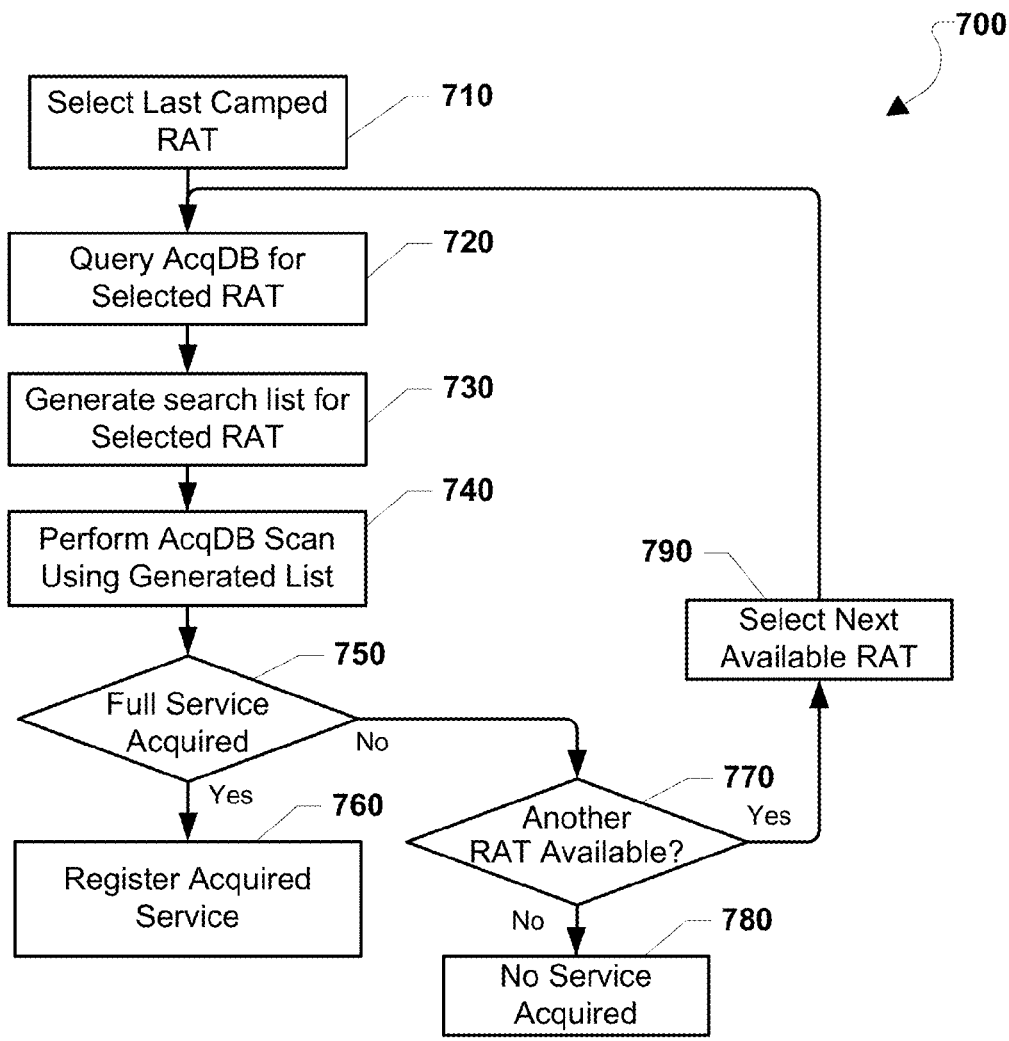
FIG. 7 is a process flow diagram illustrating an acquisition database scan according to various embodiments.

FIG. 7 illustrates a method 700 of performing technology scans for recovering from an out-of-service state in a wireless device (e.g., 110, 120, in FIGS. 1-2) according to various embodiments. The method 700 may be performed by a processor of the wireless device (e.g., 206, 216 of FIG. 2). With reference to FIGS. 1-7, the method 700 may be initiated when a last RAT on which service was registered (i.e., camped) for the wireless device is selected in block 710. The last RAT may be used for a first technology scan to acquire a renewed service connection. Thereafter, until either service is registered or no service is acquired, the processor executing the method 700 may continue using other available RATs in one or more of the process loops as described.

In block 720, the wireless device processor may query an acquisition database (AcqDB) to identifying channels corresponding to the currently selected RAT that should be used to search for service. In block 730, the wireless device processor may generate a search list (also referred to as a "technology list") by compiling acquisition database results for the selected RAT. In the first process loop, the processor may select the last RAT thus generating a first technology list from the acquisition database. In a next process loop the processor may select another RAT, generating a second technology list, and so forth in subsequent process loops. In a multi-SIM wireless device, the compiled results may include entries for the selected RAT from all or more than one available SIM. The technology list may include entries in a particular order, such that technology scans start from the beginning of the list and work their way toward the end. In block 740, the wireless device processor may perform a technology scan to acquire a renewed service connection. The technology scan searches may be performed consecutively using a first set of channels identified in a first technology list until either a renewed service connection is acquired or the first technology list is exhausted.

In determination block 750, the wireless device processor may determine whether full service is acquired as a result of the acquisition database scan. In response to determining that full service is acquired as a result of one or more of the acquisition database scans (i.e., determination block 750="Yes"), the processor may register with the acquired service in block 760. In response to determining that full service is not acquired because of the acquisition database scan (i.e., determination block 750="No"), the wireless device processor may determine whether a next RAT is available in determination block 770. In response to determining that a next RAT is available (i.e., determination block 770="Yes"), the processor may select the next RAT in block 790 and return to block 720 to query the acquisition database to generate a service renewal search list identifying channels from that next RAT (i.e., the new currently selected RAT) in a search order. In response to determining that a next RAT is not available (i.e., determination block 770="No"), the processor may cease the acquisition database scans in block 780 with no service having been acquired.

Figure 8:
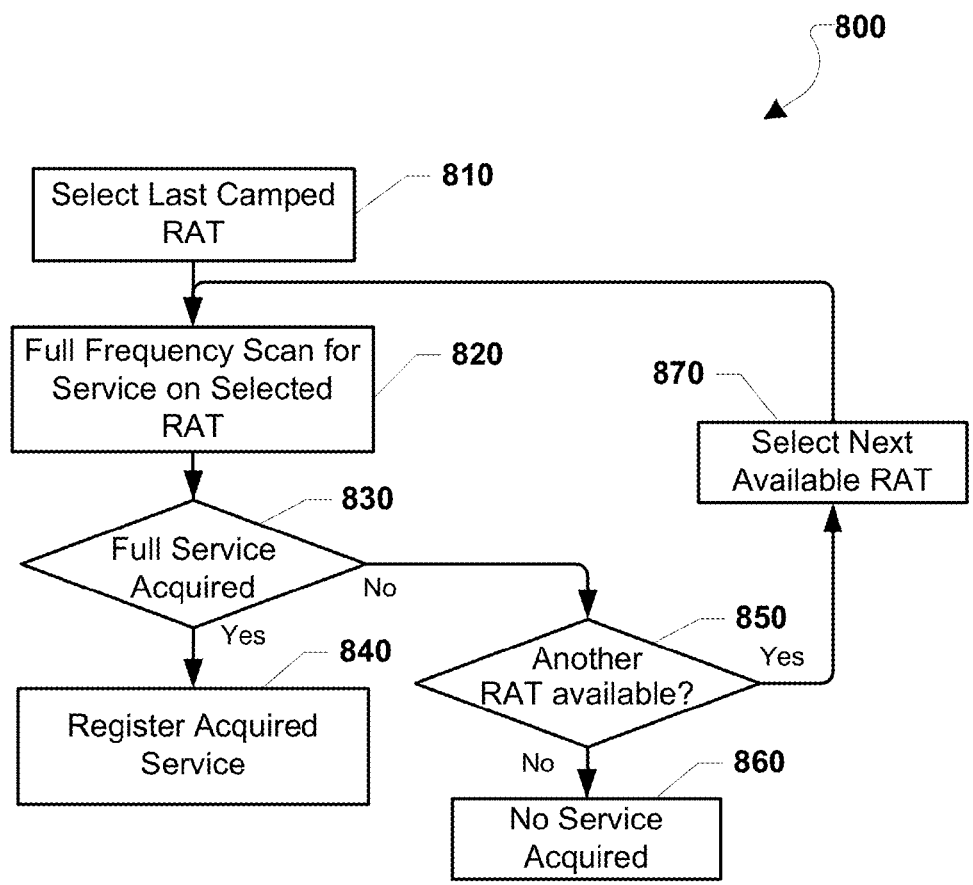
FIG. 8 is a process flow diagram illustrating a full service scan according to various embodiments.

FIG. 8 illustrates a method 800 of performing a full band scan for recovering from an out-of-service state in a wireless device (e.g., 110, 120, in FIGS. 1-2) according to various embodiments. The method 800 may be performed by a processor of the wireless device (e.g., 206, 216 of FIG. 2). With reference to FIGS. 1-8, the method 800 may be initiated when a last RAT on which service was registered (i.e., camped) for the wireless device is selected in block 810. Thereafter, until either service is acquired or no service is acquired on the available RATs, the processor may continue to execute the method 800 in one or more of the process loops as described.

In block 820, the wireless device processor may perform one or more full frequency service renewal scans to acquire a renewed service connection. The full frequency service renewal scans may be restricted to the selected technology and may continue sequentially until either service is acquired or the complete range of frequencies for the selected technology is exhausted.

In determination block 830, the wireless device processor may determine whether full service is acquired as a result of the full frequency scan. In response to determining that full service is acquired (i.e., determination block 830="Yes"), the processor may register with the acquired service in block 840. In response to determining that full service is not acquired because of the full frequency service renewal scan (i.e., determination block 830="No"), the wireless device processor may determine whether a next RAT is available in determination block 850. In response to determining that a next RAT is available (i.e., determination block 850="Yes"), the processor may select the next RAT in block 870 and perform one or more full frequency scans using that next RAT (i.e., the new currently selected RAT) in block 820. In response to determining that a next RAT is not available (i.e., determination block 850="No"), the processor may cease the full frequency service renewal scans in block 860 with no service having been acquired.

Figure 9:
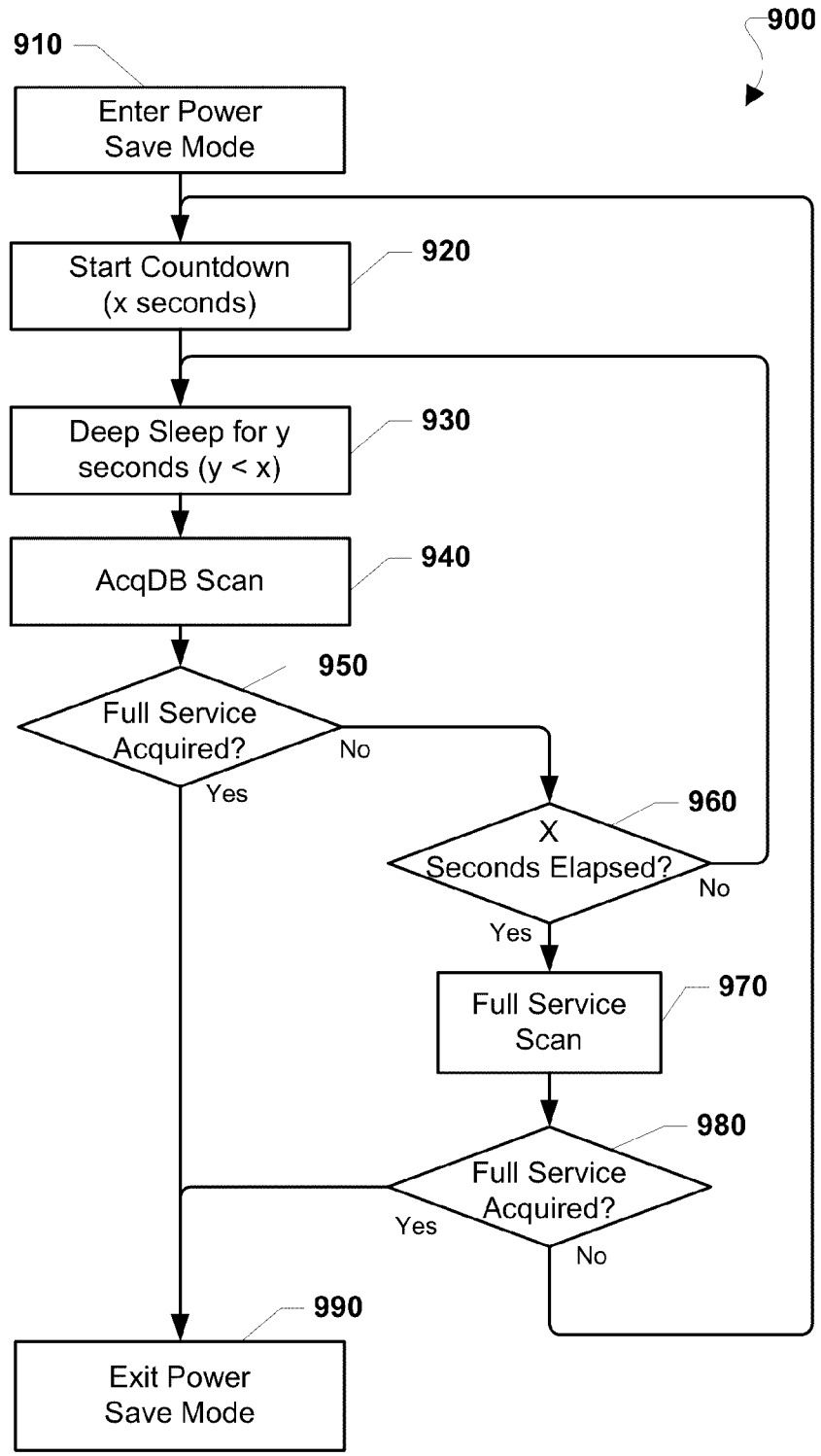
FIG. 9 is a process flow diagram illustrating a power save mode according to various embodiments.

FIG. 9 illustrates a method 900 of operating in a power save mode, which may be used to recover from an out-of-service state in a wireless device (e.g., 110, 120, in FIGS. 1-2) according to various embodiments. The method 900 may be performed by a processor of the wireless device (e.g., 206, 216 of FIG. 2). With reference to FIGS. 1-9, at the method 900 begin when the wireless device enters the power save mode in block 910. Thereafter, until service is acquired the processor may execute the method 900 in one or more of the process loops described.

In block 920, the wireless device processor may start a timer for measuring the lapse of a predetermined power-save-mode period (i.e., x seconds) or measure the lapse of time using a running system timer. Upon the expiration of the predetermined power-save-mode period, the wireless device may automatically exit the power save mode. In block 930, the wireless device processor may place the wireless device in a deep sleep for another predetermined period (i.e., a deep sleep period of y seconds). The deep sleep period may be less than the power-save-mode period (i.e., y<x). The same timer measuring the power-save-mode period may measure the deep sleep period, since this deep sleep period occurs during the power-save-mode period. Alternatively, a separate timer may measure the deep sleep period. When operating in deep sleep, the wireless device reduces power consumption by not scanning for service signals. Alternatively, when operating in deep sleep as a background process, the processor in the deep sleep mode in block 930 may perform no background activity, but may continue some foreground activity, such as the idle/connected state of a limited service connection. Upon expiration of the deep sleep period, in block 940 the wireless device processor may perform an acquisition database (AcqDB) scan to acquire a renewed service connection.

In determination block 950, the wireless device processor may determine whether full service is acquired as a result of the acquisition database scan during power save mode. In response to determining that full service is not acquired (i.e., determination block 950="No"), the processor may determine whether the power-save-mode period has expired in determination block 960. In response to determining that the power-save-mode period has not expired (i.e., determination block 960="No"), the wireless device may enter deep sleep again in block 930. In response to determining that the power-save-mode period has expired (i.e., determination block 960="Yes"), the wireless device may perform a full service scan in block 970 as described. In response to determining that full service is not acquired as a result of the full service scan (i.e., determination block 980="No"), the wireless device may return to block 920 to restart the power save mode timer again. In response to determining that full service is acquired because of the full service scan (i.e., determination block 980="Yes"), the wireless device may exit the power save mode in block 990.

Figure 10:
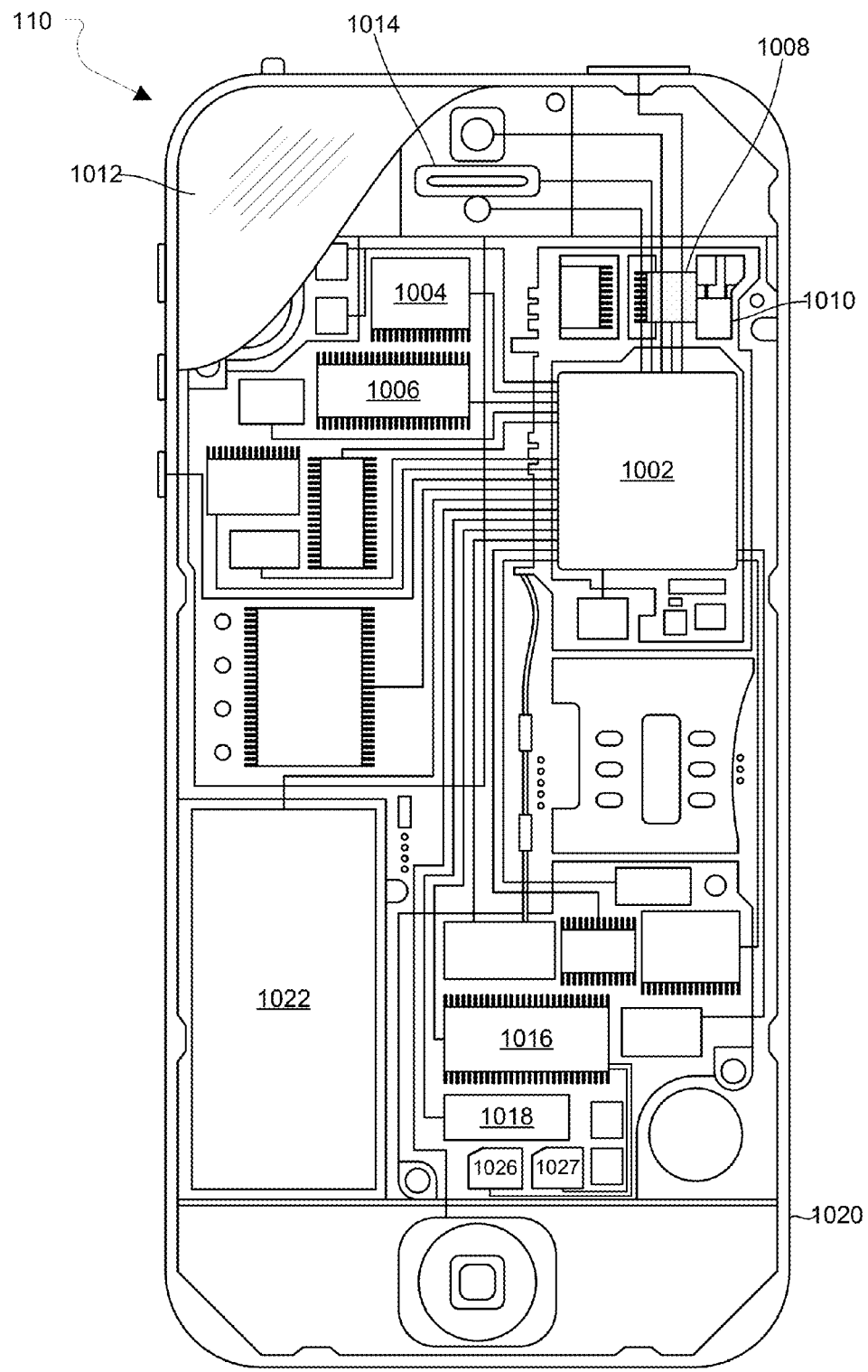
FIG. 10 is a component diagram of an example wireless device suitable for use with the various embodiments.

Various embodiments may be implemented in any of a variety of wireless devices 110, an example of which is illustrated in FIG. 10. For example, with reference to FIGS. 1-10, the wireless device 110 may include a processor 1002 coupled to a touch screen controller 1004 and an internal memory 1006. The processor 1002 may be one or more integrated circuits designated for general or specific processing tasks. The internal memory 1006 may be volatile or non-volatile memory, and may also be secure and/or encrypted memory, or unsecure and/or unencrypted memory, or any combination thereof. The touch screen controller 1004 and the processor 1002 may also be coupled to a touch screen panel 1012, such as a resistive-sensing touch screen, capacitive-sensing touch screen, infrared sensing touch screen, etc. The wireless device 110 may have one or more radio signal transceivers 1008 (e.g., Peanut®, Bluetooth®, Zigbee®, Wi-Fi, RF radio) and antennae 1010, for sending and receiving, coupled to each other and/or to the processor 1002. The radio signal transceivers 1008 and antennae 1010 may be used with the above-mentioned circuitry to implement the various wireless transmission protocol stacks and interfaces. The wireless device 110 may include a cellular network wireless modem chip 1016, coupled to SIM cards 1026, 1027, that enables communication via a cellular network and is coupled to the processor. The wireless device 110 may include a peripheral device connection interface 1018 coupled to the processor 1002. The peripheral device connection interface 1018 may be singularly configured to accept one type of connection, or multiply configured to accept various types of physical and communication connections, common or proprietary, such as USB, FireWire, Thunderbolt, or PCIe. The peripheral device connection interface 1018 may also be coupled to a similarly configured peripheral device connection port (not shown). The wireless device 110 may also include speakers 1014 for providing audio outputs. The wireless device 110 may also include a housing 1020, constructed of a plastic, metal, or a combination of materials, for containing all or some of the components discussed herein. The wireless device 110 may include a power source 1022 coupled to the processor 1002, such as a disposable or rechargeable battery. The rechargeable battery may also be coupled to the peripheral device connection port to receive a charging current from a source external to the wireless device 110.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc in which disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of recovering from an out-of-service state in a wireless device, comprising:

performing a first acquisition database scan to acquire a first renewed service connection for a first subscriber identification module (SIM) within the wireless device, wherein the first acquisition database scan includes first searches for first channels identified in a first technology list from a first acquisition database until either the first renewed service connection is acquired or the first technology list is exhausted, wherein the first technology list identifies the first channels from a first radio access technology, wherein a currently used channel associated with an acquired service of a second SIM within the wireless device is first on the first technology list;

performing a second acquisition database scan for acquiring the first renewed service connection for the first SIM in response to determining that the first technology list was exhausted, wherein the second acquisition database scan includes second searches for second channels identified in a second technology list from the first acquisition database until either the first renewed service connection is acquired or the second technology list is exhausted, wherein the second technology list identifies the second channels from a second radio access technology; and performing a first full frequency scan to acquire the first renewed service connection for the first SIM in response to determining that the second technology list was exhausted.

2. The method of claim 1, wherein the first searches included in the first acquisition database scan are performed consecutively in an order the first channels are identified in the first technology list.

3. The method of claim 1, wherein the first searches included in the first acquisition database scan are performed consecutively in an order the first channels are identified in the first technology list, and currently used channels associated with acquired services of more than one SIM within the wireless device are first on the first technology list.

4. The method of claim 3, wherein the first technology list gives priority to most recently used channels for which service was acquired for the more than one SIM.

5. The method of claim 3, wherein the first technology list gives priority to most frequently used channels for which service was acquired for the more than one SIM.

6. The method of claim 1, wherein the first technology list gives priority to most recently used channels for which service was acquired for the first SIM.

7. The method of claim 1, wherein the first searches use the first channels consecutively in an order identified in the first technology list and the first technology list is sorted by age from when service was last acquired for each channel identified.

8. The method of claim 1, further comprising:
initiating a power save mode for a predetermined period in response to determining that the first renewed service connection is not acquired from performing the first full frequency scan; and
performing the first acquisition database scan to acquire the first renewed service connection while in the power save mode.

9. The method of claim 1, further comprising:
initiating a power save mode for a predetermined period in response to determining that the first renewed service connection is not acquired from performing the first full frequency scan; and
ending the power save mode prior to a lapse of the predetermined period in response to determining the second SIM within the wireless device has acquired service.

10. The method of claim 1, further comprising:
initiating a power save mode in response to determining that the first renewed service connection is not acquired from performing the first full frequency scan; and
attempting to acquire full service by performing an acquisition database scan in the power save mode.

11. The method of claim 10, further comprising:
determining whether full service has been acquired by performing the acquisition database scan in the power save mode;
determining whether a threshold number of acquisition database scans have been performed in the power save mode in response to determining that full service has not been acquired by performing the acquisition database scan in the power save mode;
ending the power save mode in response to determining that the threshold number of acquisition database scans have been performed in the power save mode; and
attempting to acquire full service by performing another acquisition database scan in the power save mode in response to determining that the threshold number of acquisition database scans have not been performed in the power save mode.

12. The method of claim 1, wherein the first radio access technology is a most recently used radio access technology of the wireless device.

13. The method of claim 1, further comprising:
performing a limited service scan to acquire the first renewed service connection for the first SIM with limited service in response to determining service was not acquired by the first full frequency scan; and
performing the first acquisition database scan to acquire a full service connection in response to the limited service scan acquiring the limited service.

14. The method of claim 1, further comprising:
performing a third acquisition database scan to acquire a second renewed service connection for the second SIM in between the first acquisition database scan and the second acquisition database scan, wherein the third acquisition database scan is limited to channels identified in a second acquisition database associated with the second SIM.

15. The method of claim 14, further comprising:
determining whether the second renewed service connection is acquired from the third acquisition database scan; and
performing a second full frequency scan to acquire the second renewed service connection for the second SIM in response to determining that the second renewed service connection is not acquired from the third acquisition database scan.

16. A wireless device, comprising:
at least one radio frequency (RF) resource and
a processor coupled to the at least one RF resource, and configured to be coupled to a first subscriber identification module (SIM) and a second SIM, wherein the processor is configured with processor-executable instructions to:
perform a first acquisition database scan to acquire a first renewed service connection for the first SIM, wherein the first acquisition database scan includes first searches for first channels identified in a first technology list from a first acquisition database until either the first renewed service connection is acquired or the first technology list is exhausted, wherein the first technology list identifies the first channels from a first radio access technology, wherein a currently used channel associated with an acquired service of the second SIM within the wireless device is first on the first technology list;
perform a second acquisition database scan for acquiring the first renewed service connection for the first SIM in response to determining that the first technology list was exhausted, wherein the second acquisition database scan includes second searches for second channels identified in a second technology list from the first acquisition database until either the first renewed service connection is acquired or the second technology list is exhausted, wherein the second technology list identifies the second channels from a second radio access technology; and
perform a first full frequency scan to acquire the first renewed service connection for the first SIM in response to determining that the second technology list was exhausted.

17. The wireless device of claim 16, wherein the first searches included in the first acquisition database scan are performed consecutively in an order the first channels are identified in the first technology list.

18. The wireless device of claim 16, wherein the first searches included in the first acquisition database scan are performed consecutively in an order the first channels are identified in the first technology list, and currently used channels associated with acquired services of more than one SIM within the wireless device are first on the first technology list.

19. The wireless device of claim 18, wherein the first technology list gives priority to most recently used channels for which service was acquired for the more than one SIM.

20. The wireless device of claim 18, wherein the first technology list gives priority to most frequently used channels for which service was acquired for the more than one SIM.

21. The wireless device of claim 16, wherein the first technology list gives priority to most recently used channels for which service was acquired for the first SIM.

22. The wireless device of claim 16, wherein the first searches use the first channels consecutively in an order identified in the first technology list and the first technology list is sorted by age from when service was last acquired for each channel identified.

23. The wireless device of claim 16, wherein the processor is further configured with processor-executable instructions to:
initiate a power save mode for a predetermined period in response to determining that the first renewed service connection is not acquired from performing the first full frequency scan; and
perform the first acquisition database scan to acquire the first renewed service connection while in the power save mode.

24. The wireless device of claim 16, wherein the processor is further configured with processor-executable instructions to:
initiate a power save mode for a predetermined period in response to determining that the first renewed service connection is not acquired from performing the first full frequency scan; and
end the power save mode prior to a lapse of the predetermined period in response to determining the second SIM within the wireless device has acquired service.

25. The wireless device of claim 16, wherein the processor is further configured with processor-executable instructions to:
initiate a power save mode in response to determining that the first renewed service connection is not acquired from performing the first full frequency scan; and
attempt to acquire full service by performing an acquisition database scan in the power save mode.

26. The wireless device of claim 25, wherein the processor is further configured with processor-executable instructions to:
determine whether full service has been acquired by performing the acquisition database scan in the power save mode;
determine whether a threshold number of acquisition database scans have been performed in the power save mode in response to determining that full service has not been acquired by performing the acquisition database scan in the power save mode;
end the power save mode in response to determining that the threshold number of acquisition database scans have been performed in the power save mode; and
attempt to acquire full service by performing another acquisition database scan in the power save mode in response to determining that the threshold number of acquisition database scans have not been performed in the power save mode.

27. The wireless device of claim 16, wherein the processor is further configured with processor-executable instructions to:
perform a limited service scan to acquire the first renewed service connection for the first SIM with limited service in response to determining service was not acquired by the first full frequency scan; and
perform the first acquisition database scan to acquire a full service connection in response to the limited service scan acquiring the limited service.

28. The wireless device of claim 16, wherein the processor is further configured with processor-executable instructions to:
perform a third acquisition database scan to acquire a second renewed service connection for the second SIM in between the first acquisition database scan and the second acquisition database scan, wherein the third acquisition database scan is limited to channels identified in a second acquisition database associated with the second SIM.

29. A wireless device, comprising:
means for performing a first acquisition database scan to acquire a first renewed service connection for a first subscriber identification module (SIM) within the wireless device, wherein the first acquisition database scan includes first searches for first channels identified in a first technology list from a first acquisition database until either the first renewed service connection is acquired or the first technology list is exhausted, wherein the first technology list identifies the first channels from a most recently used radio access technology, wherein a currently used channel associated with an acquired service of a second SIM within the wireless device is first on the first technology list;
means for performing a second acquisition database scan for acquiring the first renewed service connection for the first SIM in response to determining that the first technology list was exhausted, wherein the second acquisition database scan includes second searches for second channels identified in a second technology list from the first acquisition database until either the first renewed service connection is acquired or the second technology list is exhausted, wherein the second technology list identifies the second channels from another radio access technology; and
means for performing a first full frequency scan to acquire the first renewed service connection for the first SIM in response to determining that the second technology list was exhausted.

30. A non-transitory processor-readable storage medium having stored thereon processor-executable instructions configured to cause a processor to perform operations for recovering from an out-of-service state in a wireless device, the operations comprising:
performing a first acquisition database scan to acquire a first renewed service connection for a first subscriber identification module (SIM) within the wireless device, wherein the first acquisition database scan includes first searches for first channels identified in a first technology list from a first acquisition database until either the first renewed service connection is acquired or the first technology list is exhausted, wherein the first technology list identifies the first channels from a most recently used radio access technology, wherein a currently used channel associated with an acquired service of a second SIM within the wireless device is first on the first technology list;
performing a second acquisition database scan for acquiring the first renewed service connection for the first SIM in response to determining that the first technology list was exhausted, wherein the second acquisition database scan includes second searches for second channels identified in a second technology list from the first acquisition database until either the first renewed service connection is acquired or the second technology list is exhausted, wherein the second technology list identifies the second channels from another radio access technology; and performing a first full frequency scan to acquire the first renewed service connection for the first SIM in response to determining that the second technology list was exhausted.

\* \* \* \* \*